United States Patent
Miyamoto

(10) Patent No.: US 9,571,680 B2
(45) Date of Patent: Feb. 14, 2017

(54) IMAGE FORMING APPARATUS THAT DISPLAYS SETTING VALUES OF ANOTHER IMAGE FORMING APPARATUS SELECTED IN ADVANCE, AND IMAGE FORMING SYSTEM THEREFOR

(71) Applicant: KYOCERA Document Solutions Inc., Osaka (JP)

(72) Inventor: Takanori Miyamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/832,487

(22) Filed: Aug. 21, 2015

(65) Prior Publication Data

US 2016/0065766 A1 Mar. 3, 2016

(30) Foreign Application Priority Data

Aug. 26, 2014 (JP) ................................ 2014-171753

(51) Int. Cl.
H04N 1/00 (2006.01)

(52) U.S. Cl.
CPC ...... *H04N 1/00517* (2013.01); *H04N 1/00506* (2013.01)

(58) Field of Classification Search
None
See application file for complete search history.

(56) References Cited

U.S. PATENT DOCUMENTS

| 2004/0227777 | A1 | 11/2004 | Hananoi | ........................ 345/705 |
| 2007/0279655 | A1* | 12/2007 | Murakawa | ............... H04N 1/00 358/1.9 |
| 2012/0044531 | A1* | 2/2012 | Sakai | ................. H04N 1/00954 358/1.15 |
| 2014/0139871 | A1* | 5/2014 | Igarashi | ............. H04N 1/00344 358/1.15 |
| 2015/0334262 | A1* | 11/2015 | Tsuruoka | ........... H04N 1/00973 358/1.13 |
| 2015/0373216 | A1* | 12/2015 | Maeda | ............... H04N 1/00514 358/1.14 |

FOREIGN PATENT DOCUMENTS

JP 2004-297776 A 10/2004

\* cited by examiner

*Primary Examiner* — Thomas D Lee
(74) *Attorney, Agent, or Firm* — Stein IP, LLC

(57) ABSTRACT

An image forming apparatus includes a display portion that displays a setting screen, a communication portion that receives, from an information processing apparatus, an information package including a setting history and configuration information of another image forming apparatus chosen in advance, a storage portion that stores the received information package, and a control portion that extracts, based on information included in the information package, a recommended value of a setting value settable based on a setting screen currently displayed at the display portion, and that makes the display portion display one or a plurality of extracted recommended values within a recommended-value display area.

14 Claims, 11 Drawing Sheets

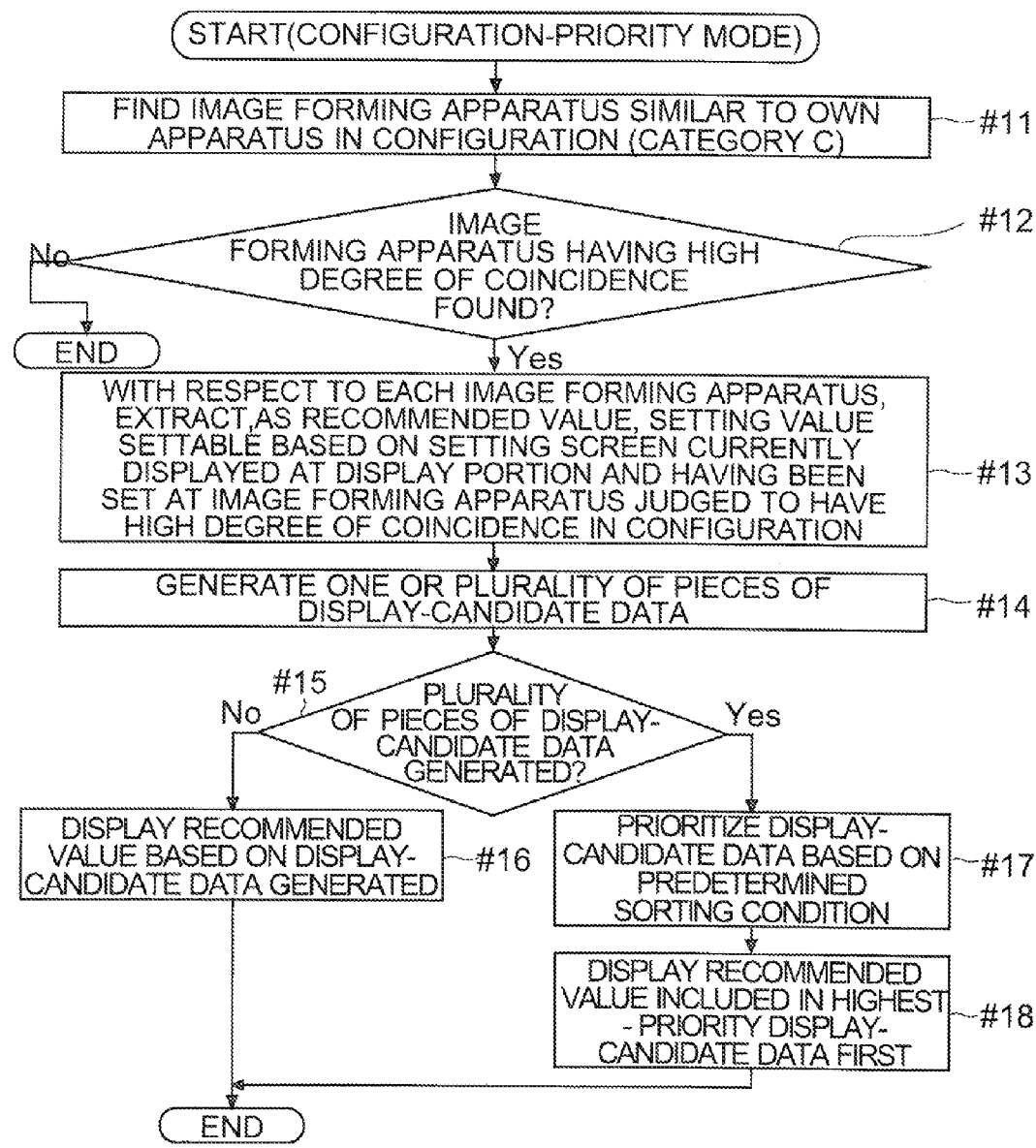

FIG.14
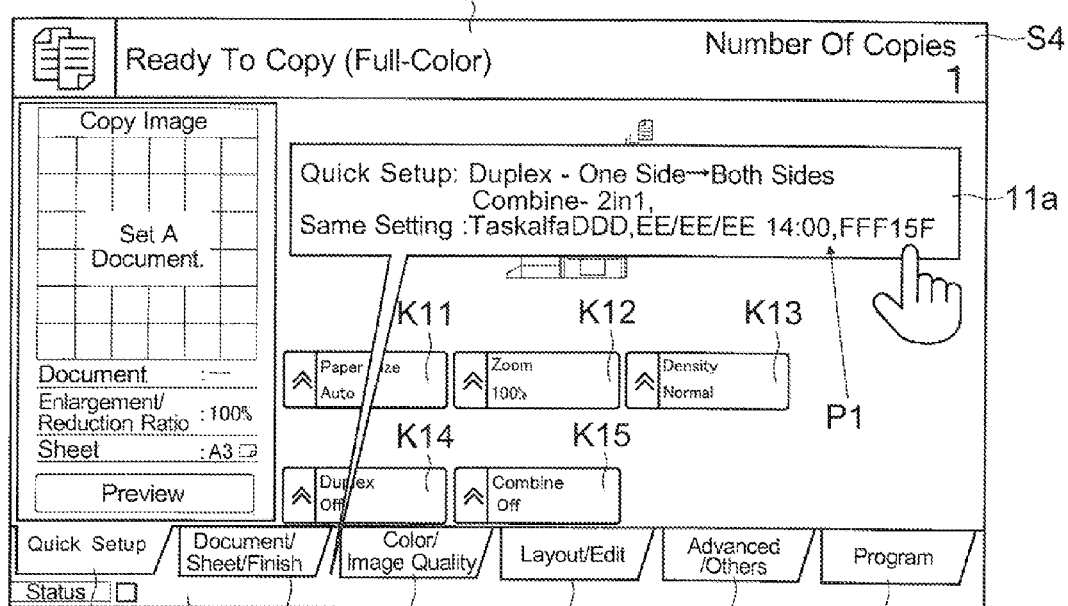
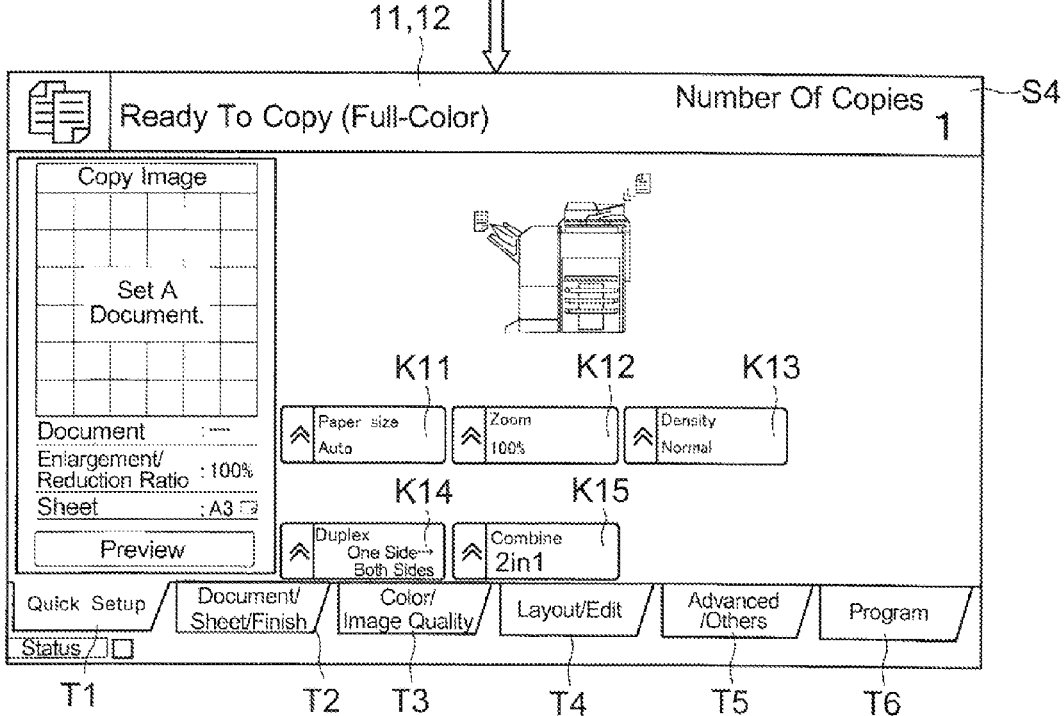

FIG.15
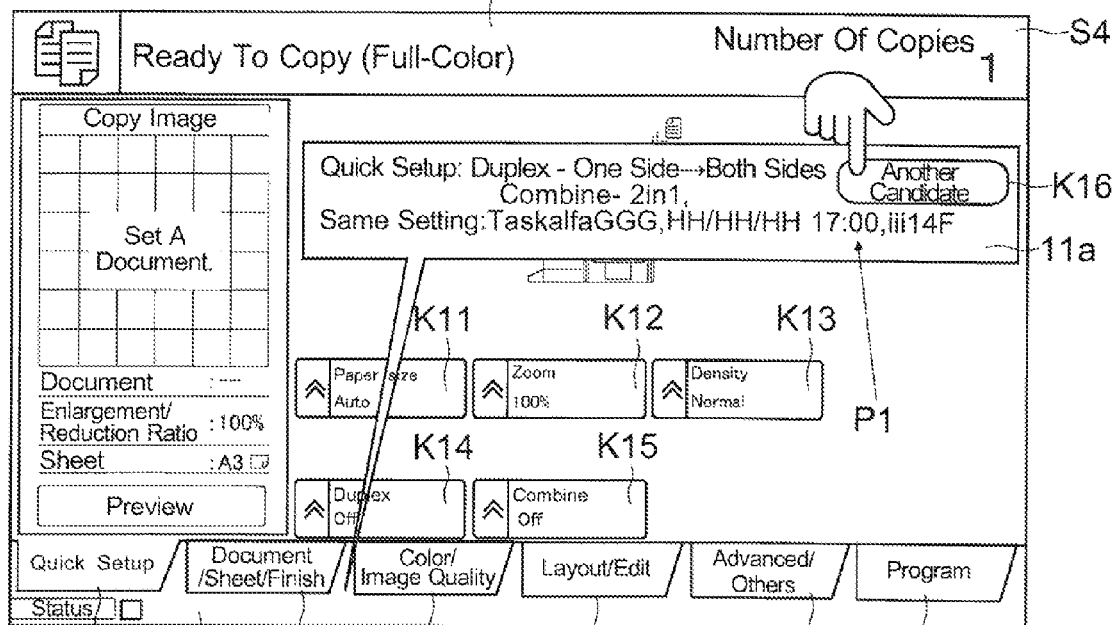
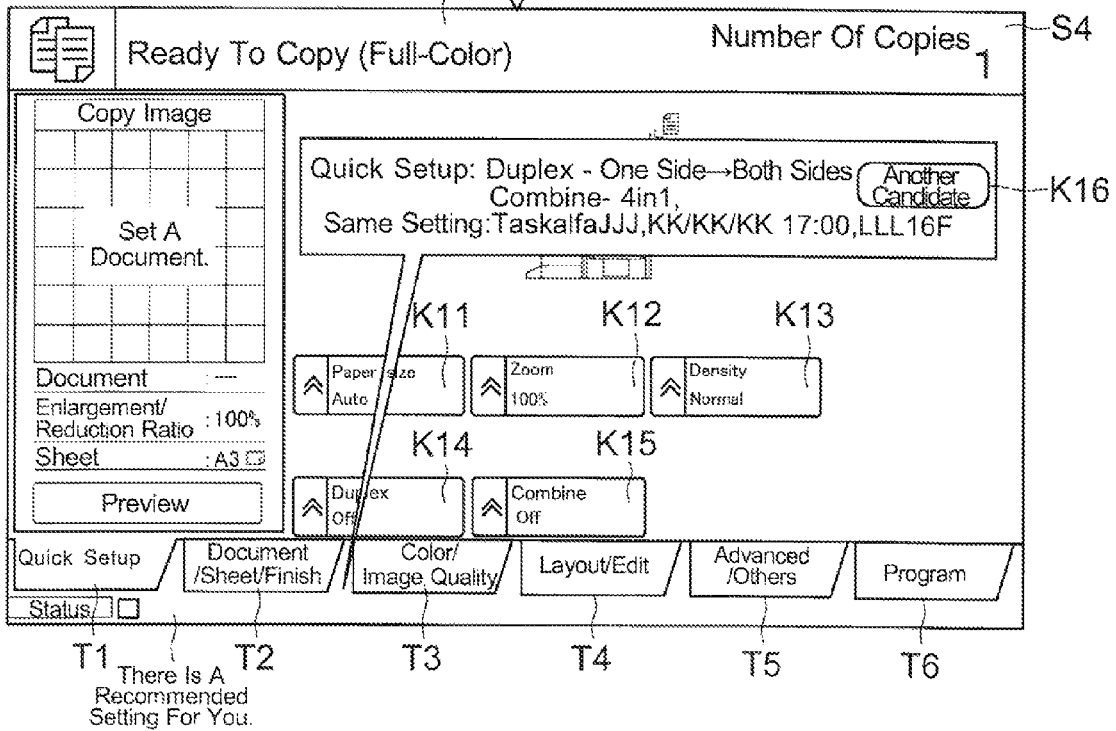

IMAGE FORMING APPARATUS THAT DISPLAYS SETTING VALUES OF ANOTHER IMAGE FORMING APPARATUS SELECTED IN ADVANCE, AND IMAGE FORMING SYSTEM THEREFOR

INCORPORATION BY REFERENCE

This application is based upon and claims the benefit of priority from the corresponding Japanese Patent Application No. 2014-171753 filed on Aug. 26, 2014, the entire contents of which are incorporated herein by reference.

BACKGROUND

The present disclosure relates to an image forming apparatus that receives settings of various setting values. The present disclosure also relates to an image forming system including such an image forming apparatus.

Some image forming apparatuses such as multifunction peripherals, copiers, facsimile machines, and printers are equipped with a portion that provides a user with guidance (explanation, manual) on operations and settings. For example, there has been known an electronic apparatus including a display portion, a plurality of device portions as targets of maintenance, at least one guidance portion (sheet-shaped member where warning and guidance are indicated) to indicate guidance information including operation procedures and warnings related to maintenance, the guidance portion being disposed at a location corresponding to one of the device portions to which the guidance information is related, and a control portion to display guidance information indicated by a corresponding guidance portion on the display portion, in response to a display instruction.

A maintenance checkup of image forming apparatuses requires technical knowledge. This is the background for maintenance contracts sometimes made between customers and maintenance (support) service providers (such as image-forming-apparatus production and sales companies and their related companies). Under such contracts, a customer makes contact with a service center. Based on the contact from the customer, a service engineer visits the customer. The service engineer dispatched from the service provider company offers maintenance services such as a checkup, making settings, and handling malfunctions. Visiting where an image forming apparatus is installed, for example, a service engineer makes various settings in a manner suitable to the customer's environment, for example. There may be a case where a customer is at a loss about how to make settings calls for a service engineer to visit him or her. In such a case, a dispatched service engineer explains to the customer how to make settings, or the dispatched service engineer himself or herself makes settings for the customer.

The cost for such dispatch of a service engineer (that is, for services offered) is to be charged to customers. Thus, it is likely that the operational cost of an image forming apparatus increases the more frequently a customer requests dispatch of a service engineer. With such a background, there is a demand to reduce the number times service engineers visit customers or have to be dispatched to customers as much as possible to reduce the operational cost.

The reduction in number of times service engineers are dispatched to customers will increase the number of opportunities where customers have to make settings and perform maintenance by themselves. Possible solutions to help customers in such cases include introducing an on-line help function and making the settings easy to do by improving help screens to be displayed on image forming apparatuses. Help information, however, is directed to all the users and thus is somewhat uniform. Thus, these possible solutions are disadvantageous in that even with help information, it is sometimes difficult for customers to appropriately make settings by themselves for intricate and specialized image forming apparatuses to suit their installation environments.

Note that, in the above-described known art, the display portion displays a sheet that indicates sentences and figures for guidance and that is attached to the apparatus. There, the user is provided with only a limited amount of information, and cannot obtain more information than is described on the sheet. Thus, the above-described known art is not helpful to solve the above-described problem.

SUMMARY

According to one aspect of the present disclosure, an image forming apparatus includes a display portion, a communication portion, a storage portion, an operation portion, a control portion, etc. The display portion displays a setting screen for making a setting. The communication portion communicates with an information processing apparatus that collects, from each of image forming apparatuses to which the information processing apparatus is communicably connected, a setting history that includes: a setting value set in each of the image forming apparatuses and a setting date and time of the setting value; and configuration information indicating a configuration of each of the image forming apparatuses, and the communication portion receives, from the information processing apparatus, an information package for providing guidance with a user, the information package including the setting history and the configuration information of an image forming apparatus chosen in advance. The storage portion stores therein the information package. The operation portion receives an operation performed with respect to a setting screen of the display portion and an operation of setting a setting value. Based on a recommended-value related setting made at the operation portion in advance, the control portion extracts a recommended value of one setting value or of each of a plurality of setting values settable based on a currently displayed setting screen at the display portion, and makes the display portion display the recommended value, which has been extracted, within a recommended-value display area superimposed on the currently displayed setting screen.

Further features and advantages of the present disclosure will become apparent from the description of embodiments given below.

BRIEF DESCRIPTION OF THE DRAWINGS

FIG. 10 is a flow chart showing a flow of extracting a recommended value in a configuration-priority mode according to the embodiment.

FIG. 11 shows an example of a table used in recommended-value extracting processing according to the embodiment.

FIG. 14 is a diagram showing an example of the display of recommended values and an example of the settings made by using the recommended values, on the main setting screen for the copy function according to the embodiment.

FIG. 15 is a diagram showing an example of recommended-value switching according to the embodiment performed when a plurality of pieces of display-candidate data are generated.

DETAILED DESCRIPTION

According to the present disclosure, in order to allow a user himself or herself to make an appropriate setting of an image forming apparatus with ease, a setting made at another image forming apparatus is referred to, and a recommended value is displayed which is highly possibly appropriate as a setting value. Now, an embodiment of the present disclosure will be described hereafter referring to FIG. 1 to FIG. 15. The following description will deal with an image forming system 300 that includes a multifunction peripheral 100 as an image forming apparatus and an information processing apparatus 200. It should be understood, however, that factors such as configurations and arrangements described herein are merely illustrative examples, and are not to be construed as limiting on the present disclosure.

(Outline of Image Forming System 300)

Figure 1:
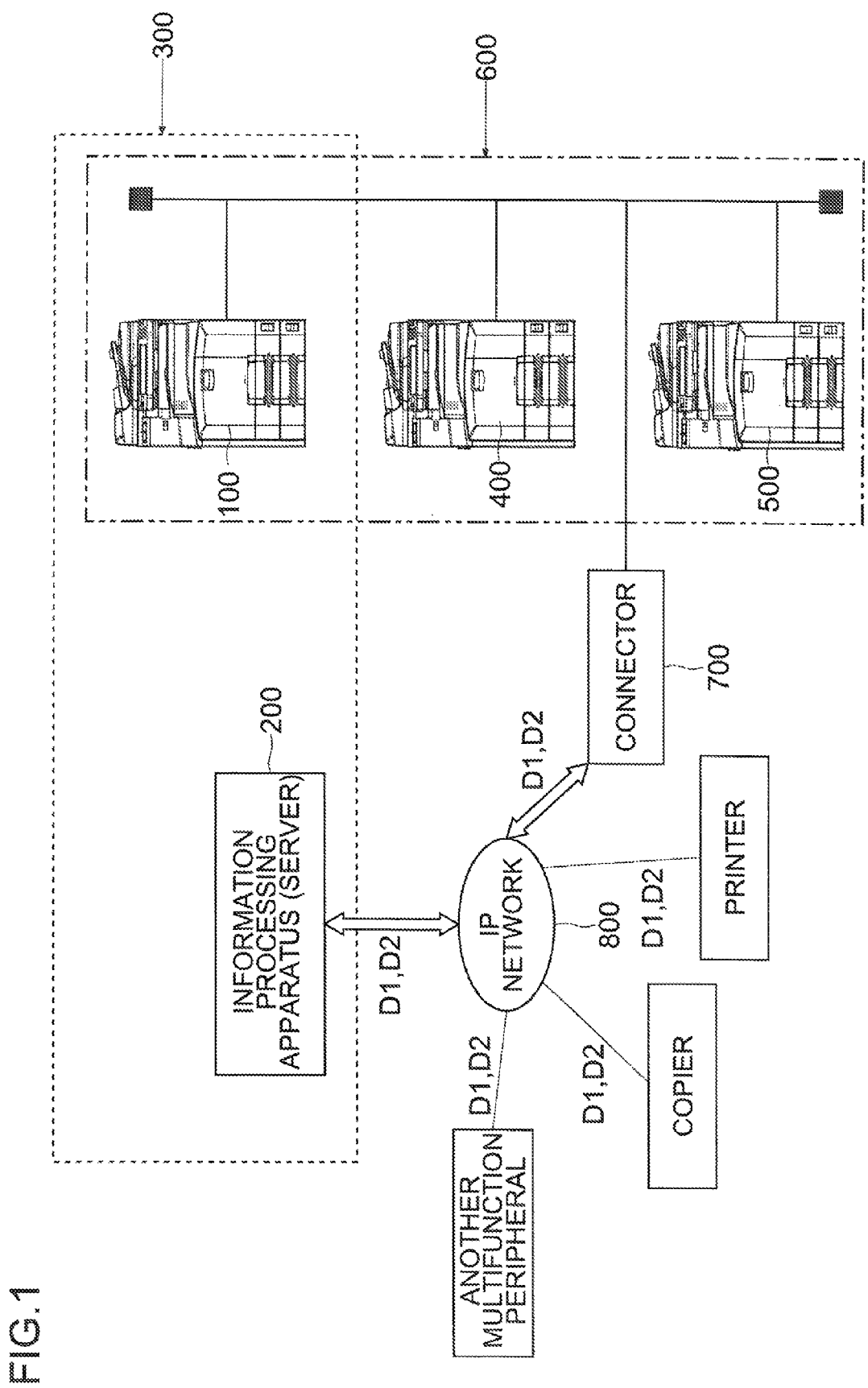
FIG. 1 is a diagram showing an example of an image forming system according to an embodiment.

First, a description will be given of an example of the image forming system 300 according to the present embodiment, using FIG. 1. FIG. 1 is a diagram showing an example of the image forming system 300.

The image forming system 300 includes the multifunction peripheral 100 and the information processing apparatus 200. The multifunction peripheral 100 is an image forming apparatus provided with a plurality of functions such as a print function, a copy function, a scan-transmission function, and a box function. The information processing apparatus 200 is what is called a server. Note that FIG. 1 shows an image forming apparatus 400 and an image forming apparatus 500 as image forming apparatuses belonging to the same local network 600 (the same group). The image forming apparatuses in the same local network 600 are each communicably connected to the information processing apparatus 200 via a connector 700, such as a gateway, and an IP network 800.

The information processing apparatus 200 is installed at a service center, etc. Via the IP network 800, etc., the information processing apparatus 200 collects configuration information D1 and a setting history D2 (a bunch of setting logs) from each of image forming apparatuses (the multifunction peripheral 100, the image forming apparatus 400, the image forming apparatus 500, and other image forming apparatuses outside the local network 600, such as a multifunction peripheral, a copier, a printer, etc.) which are communicably connected to the information processing apparatus 200. The configuration information D1 is data indicating the configuration of an image forming apparatus. The setting history D2 includes a setting value set at each individual image forming apparatus and the setting date and time of the setting value. The information processing apparatus 200 is capable of performing statistical processing such as trend research. Furthermore, the information processing apparatus 200 also has a function as a central control portion that gives instructions to image forming apparatuses that is communicably connected thereto and remote-controllable (image forming apparatuses produced by one who has installed the information processing apparatus 200).

The configuration information D1 is information that indicates the configuration of an image forming apparatus. The information processing apparatus 200 collects the configuration information D1 of each of the image forming apparatuses. Here, what information to be included in the configuration information D1 can be decided as necessary. In the image forming system 300, the information processing apparatus 200, and the multifunction peripheral 100 of the present embodiment, treated as the configuration information D1 is information of the following: type name, name (host name) of each image forming apparatus, kinds and numbers of optional devices connected to each image forming apparatus, network address, MAC address, affiliation organization, installation location, and affiliation department of each image forming apparatus, etc. Pieces of information treated as the configuration information D1 are stored in a storage portion of each individual image forming apparatus in a non-volatile manner. Information of group, installation location, and installation department are registered in each image forming apparatus in accordance with installation of each image forming apparatus.

As for a setting value for job execution (that is, a setting value set when using functions such as copy, transmission, and box functions), a date and time of job execution and the setting value set (changed from the default value) for the job execution are temporarily stored in each of the image forming apparatuses until they are collected by the information processing apparatus 200. When a plurality of setting values are set for a single job as in a case where, for the copy function, a plurality of setting items such as duplex copy, density, and enlargement/reduction ratio are changed from their default values, a combination of the plurality of setting values is stored in the storage portion of each of the image forming apparatuses as a history (a log).

On the other hand, a setting value unaccompanied by job execution, such as a setting value in system setting including language setting and setting related to network communication, is also temporarily stored as a history (log) in the storage portion of each of the image forming apparatuses, together with its setting date and time.

The information processing apparatus 200 collects and accumulates the setting history D2 (logs) and the configuration information D1 from each of the image forming apparatuses. In other words, the image forming apparatuses each transmit the configuration information D1 and the setting history D2 (logs) to the information processing apparatus 200. Here, the transmission and reception of the setting history D2 may be performed each time a job is executed and each time a setting value is set. The transmission and reception of the accumulated setting history D2

(logs) may be performed between each of the image forming apparatuses and the information processing apparatus 200 periodically, once in a predetermined time period, that is, for example, once in the morning, once in the afternoon, every one to several hours, once a day, every several days, once a week, once a month, etc. In such a case, with respect to each of the communicable image forming apparatuses chosen in advance as targets of history collection, the information processing apparatus 200 collects, as the setting history D2, a setting history representing one time of setting or several times of settings (log or logs) from each of the image forming apparatuses. Then, the information processing apparatus 200 stores therein a bunch of setting histories of each of the image forming apparatuses as the setting history D2 in a non-volatile and accumulating manner.

Or, the information processing apparatus 200 may send each of the individual image forming apparatuses a transmission request to transmit thereto the setting history D2 and the configuration information D1 such that the image forming apparatuses, in response to the transmission request, each send the setting history D2 and the configuration information D1 to the information processing apparatus 200. Usually, the frequency of updating the configuration information D1 is not high. With this in mind, it may be such that, after transmitting the configuration information D1 to the information processing apparatus 200 for the first time, each of the image forming apparatuses transmits an update of the configuration information D1 to the information processing apparatus 200 only when there is a change made to the configuration information D1.

The information processing apparatus 200 generates an information package 6 to be transmitted to the multifunction peripheral 100 based on the setting history D2 and the configuration information D1 of each of the individual image forming apparatuses that have been collected, and the multifunction peripheral 100 receives the information package 6 (a detailed description of which will be given later).

(Outline of Image Forming Apparatus)

Figure 2:
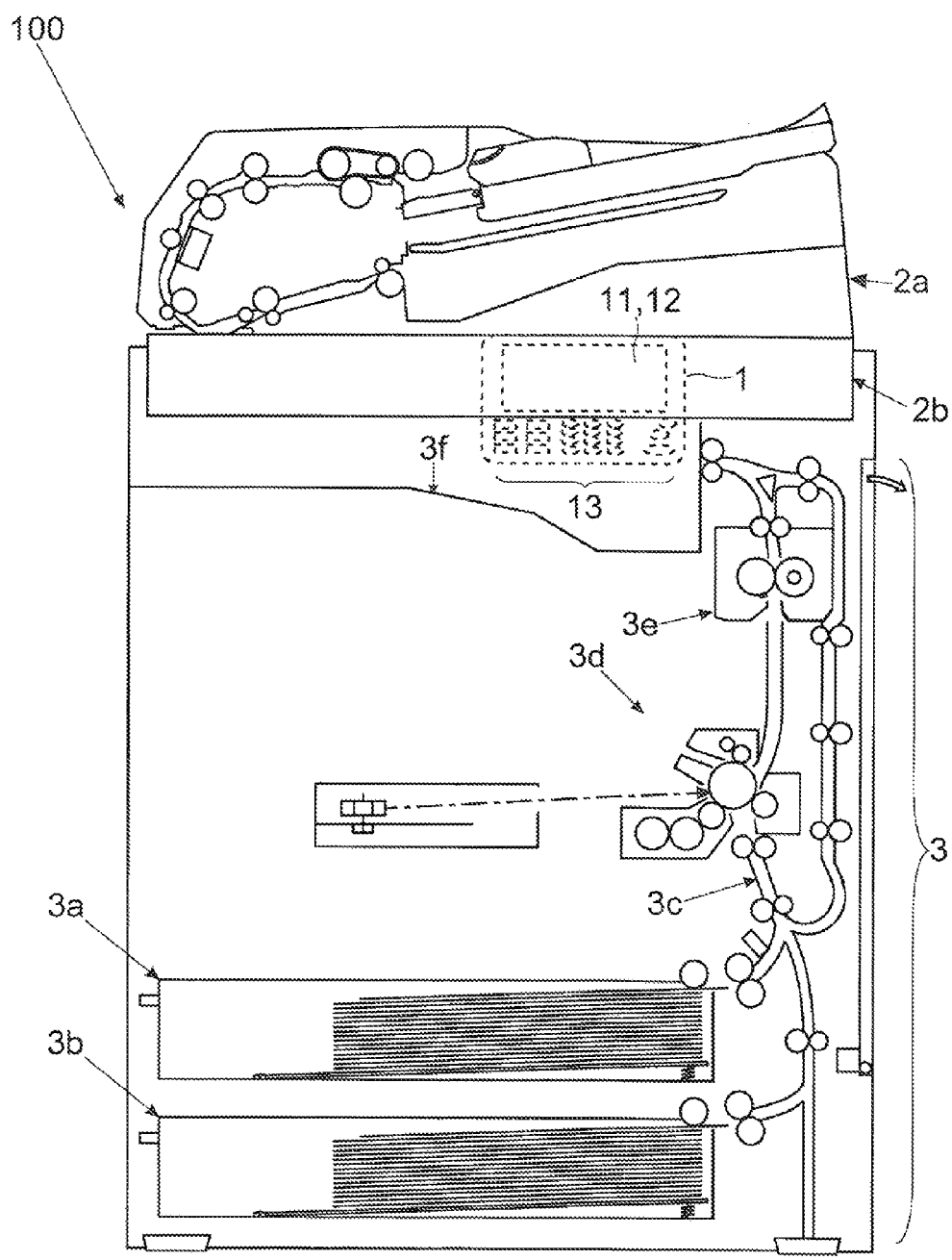
FIG. 2 is a diagram showing an example of a multifunction peripheral 100 according to the embodiment.

Next, based on FIG. 2, a description will be given of the outline of the multifunction peripheral 100 according to the present embodiment. FIG. 2 is a diagram showing an example of the multifunction peripheral 100 according to the present embodiment.

Note that the multifunction peripheral 100 is of the same model and configuration as the image forming apparatuses 400 and 500 shown in FIG. 1.

As shown in FIG. 2, the multifunction peripheral 100 includes an operation panel 1 (indicated by a broken line) disposed on its front face. The multifunction peripheral 100 also has a document conveying portion 2*a* and an image reading portion 2*b* disposed in an upper portion thereof. The multifunction peripheral 100 further includes a printing portion 3 (a first sheet feeding portion 3*a*, a second sheet feeding portion 3*b*, a conveying portion 3*c*, an image forming portion 3*d*, and fixing portion 3*e*) disposed inside thereof.

The operation panel 1 includes a display portion 11 that displays condition of the multifunction peripheral 100, various messages, and various setting screens (screens used to make settings). Further, a touch panel portion 12 (which corresponds to an operation portion) is provided in a top surface of the display portion 11. The touch panel portion 12 is used for recognizing the position and coordinates of a part pressed by a user on the display portion 11. Based on output of the touch panel portion 12, a button or key (a soft key) pressed (operated) by the user is recognized. The operation panel 1 is also provided with a plurality of hard keys 13 (which correspond to the operation portion) including a start key and numeric-key pad. The operation portion constituted by these portions receives an operation performed on the setting screens of the display portion 11 and an operation of setting a setting value. Note that the operation panel 1 is provided with a panel control portion 14 (see FIG. 3) that controls the display on the display portion 11 in response to an instruction received from a primary control portion 4 and recognizes which of the soft keys and the hard keys 13 has been operated based on the output of the touch panel portion 12.

The document conveying portion 2*a* automatically conveys set documents continuously one by one toward a feed-reading contact glass (reading position, not shown). The document conveying portion 2*a* is an optional device (an ordinarily equipped device corresponding to the document conveying portion 2*a* is a presser plate openable/closable in an up-and-down direction). The image reading portion 2*b* generates image data by reading a document passing over the feed-reading contact glass or a document placed on a placement-reading contact glass (not shown).

The first sheet feeding portion 3*a* and the second sheet feeding portion 3*b* each hold a plurality of sheets therein. When performing a printing job, either the first sheet feeding portion 3*a* or the second sheet feeding portion 3*b* sends the sheets one by one to the conveying portion 3*c*. The first sheet feeding portion 3*a*, which is disposed above the second sheet feeding portion 3*b*, is a sheet feeding device normally equipped to the multifunction peripheral 100. The second sheet feeding portion 3*b*, which is similar to the first sheet feeding portion 3*a* in configuration, is an optional device additionally equipped to hold an increased number of sheets and sheets of increased number of sizes. In the multifunction peripheral 100 shown in FIG. 2, only one optional sheet feeding device (one stage) is additionally provided. However, it is possible to further add a plurality of (two or three, for example) optional sheet feeding devices either of the same type or of different types (such as one that accommodates even more sheets).

The conveying portion 3*c* conveys a sheet fed from the first sheet feeding portion 3*a* or the second sheet feeding portion 3*b*. The image forming section 3*d* forms a toner image based on image data, and transfers the toner image onto sheet conveyed thereto. The fixing section 3*e* fixes the transferred toner image on the sheet. The sheet having the toner image fixed thereon is delivered to a delivery tray 3*f*.

(Hardware Configuration of Image Forming System 300)

Figure 3:
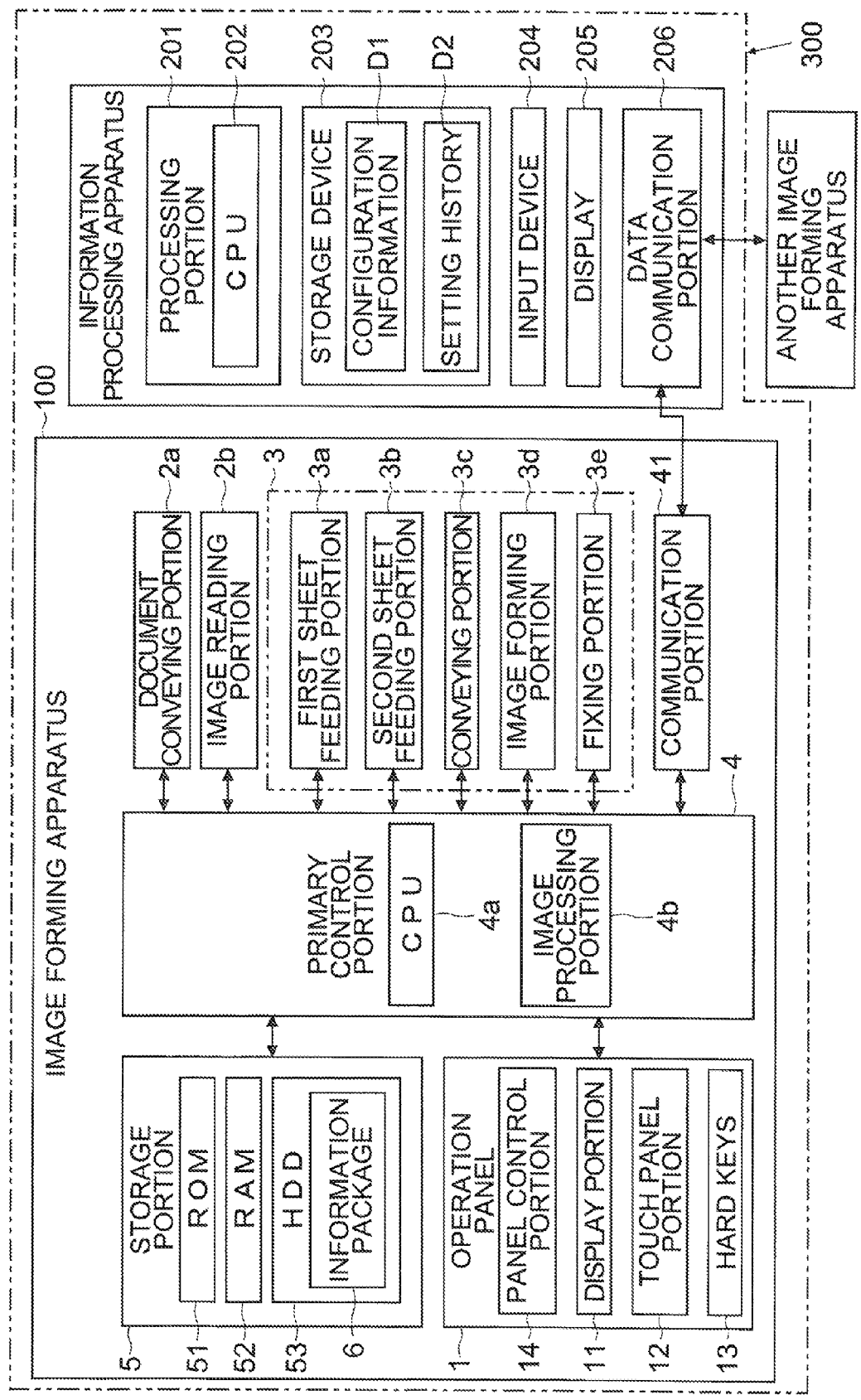
FIG. 3 is a diagram showing an example of a configuration of the image forming system according to the embodiment.

Next, based on FIG. 3, a description will be given of an example of the hardware configuration of the image forming system 300 according to the present embodiment. FIG. 3 is a diagram showing an example of the configuration of the image forming system 300.

The primary control portion 4 is provided inside the multifunction peripheral 100. The primary control portion 4 manages the operational control of an image forming apparatus. Moreover, the primary control portion 4 controls display on the operation panel 1, and recognizes contents of inputs entered (keys and tabs operated) via the operation panel 1 based on outputs from the touch panel portion 12 and the hard keys 13. The primary control portion 4 includes circuits such as a CPU 4*a* and an image processing portion 4*b*. Here, the primary control portion 4 may be separated into a plurality of kinds of control portions depending on the function, such control portions including a main control portion that performs overall control and image processing, and an engine control portion that performs image formation and controls the turning ON/OFF of motors or the like that cause various rotational bodies to rotate.

The CPU 4a is a central processing unit. The CPU 4a controls individual portions of the image forming apparatus and performs various computations based on programs and data stored in a storage portion 5. The image processing portion 4b performs processing regarding image data. For example, the image processing portion 4b is capable of performing image processing such as density-conversion and enlargement/reduction on image data to be printed, and processing such as converting the format of image data that has been read at the image reading portion 2b.

The storage portion 5 includes a ROM 51, a RAM 52, and an HDD 53. The storage portion 5 is configured by combining volatile and non-volatile storage devices. The storage portion 5 is capable of storing therein various pieces of data including various control programs and control data of the multifunction peripheral 100, setting data, and image data. Moreover, the storage portion 5 (the HDD 53) stores therein the information package 6 received from the information processing apparatus 200.

Furthermore, the primary control portion 4 is connected to the operation panel 1, the document conveying portion 2a, the image reading portion 2b, the printing portion 3, etc. by means of a bus, a signal line, and the like. The primary control portion 4 recognizes the existence of the individual portions and devices. And the primary control portion 4 controls the operations of the multifunction peripheral 100 including scanning and printing operations. Further, the primary control portion 4 is also connected to a communication portion 41 provided with various connectors, sockets, chips for communication control, etc. Via a network, a public line, or a cable, the communication portion 41 is communicably connected to the local network 600, another image forming apparatus, and the information processing apparatus 200 (a data communication portion 206). The communication portion 41 is capable of exchanging various pieces of data with the information processing apparatus 200.

Next, the information processing apparatus 200 will be described. For example, the information processing apparatus 200 includes: a processing portion 201 (a main control circuit board) provided with a CPU 202; a storage device 203 configured with an HDD, a RAM, and a ROM; an input device 204 such as a keyboard and a mouse; a display 205 as a display device; and a data communication portion 206 which is an interface for communication with an external apparatus, etc.

The processing portion 201 is a circuit board on which circuits such as a CPU 202 and chips are mounted. The processing portion 201 performs processing such as computation and control in the information processing apparatus 200. The storage device 203 stores therein, in a non-volatile manner, programs and data necessary to operate and to use the information processing apparatus 200. Moreover, the storage device 203 stores therein, in a non-volatile manner, the setting history D2 and the configuration information D1 collected from each of the individual image forming apparatuses. The processing portion 201 also generates the information package 6 for the multifunctional peripheral 100, and has the generated information package 6 transmitted from the data communication portion 206 to the multifunction peripheral 100.

(Example of Settings at Multifunction Peripheral 100)

Next, a description will be given of an example of settings made on the multifunction peripheral 100 according to the present embodiment, with reference to FIG. 4 to FIG. 7.

Figure 4:
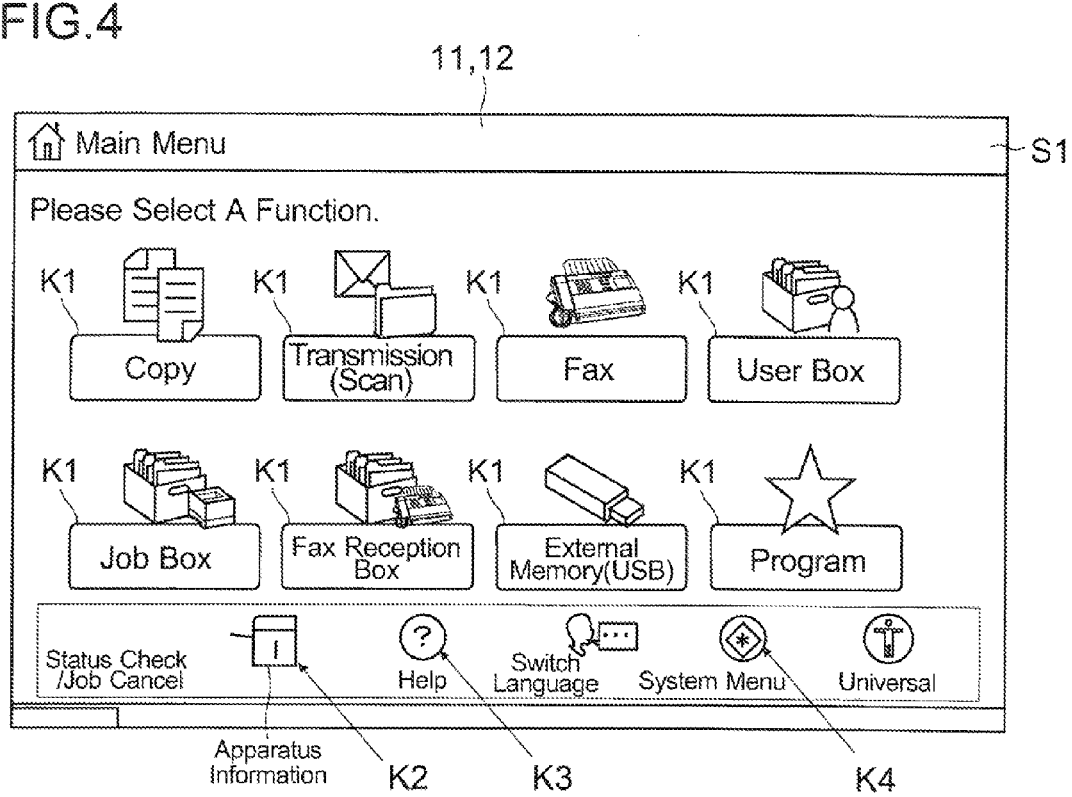
FIG. 4 is diagram showing an example of a main menu screen according to the embodiment.
Figure 5:
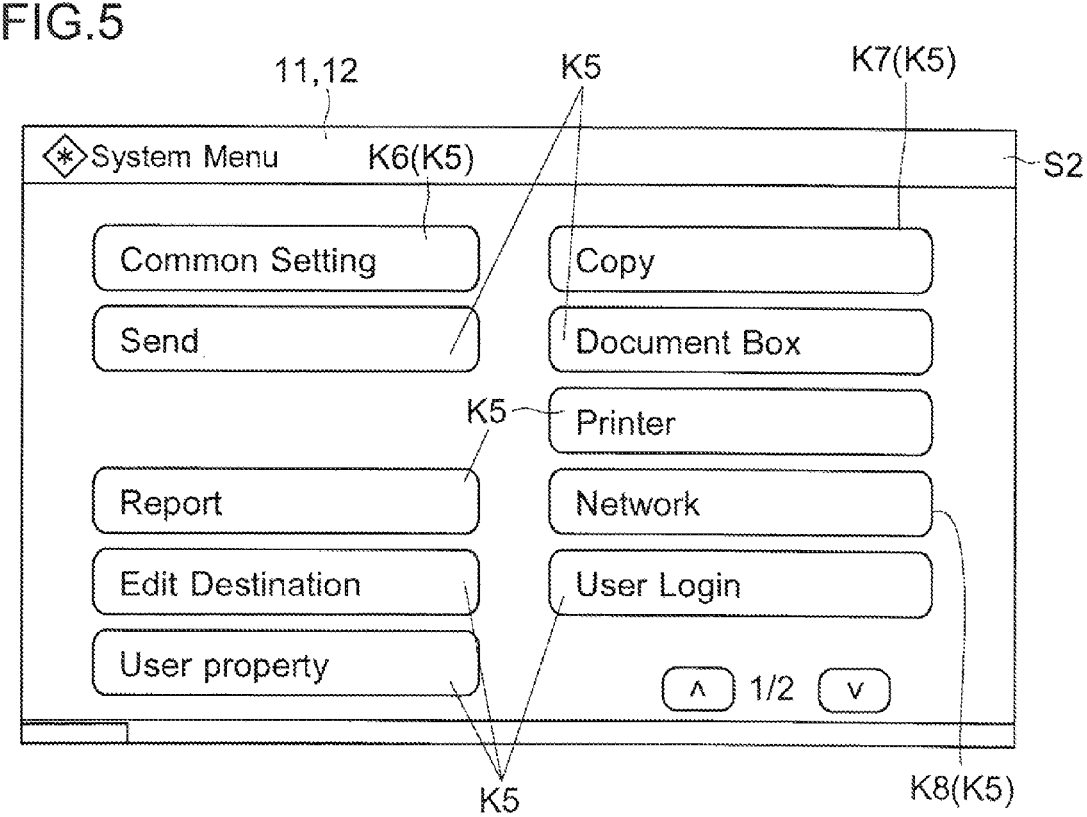
FIG. 5 is a diagram showing an example of a system menu screen according to the embodiment.
Figures 6, 7:
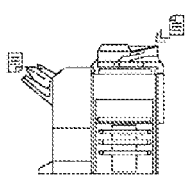
FIG. 6 is a diagram showing an example of a network setting screen according to the embodiment.
FIG. 7 is a diagram showing an example of a main setting screen for a copy function according to the embodiment.

FIG. 4 is a diagram showing an example of a main menu screen S1. FIG. 5 is a diagram showing an example of a system menu screen S2. FIG. 6 is a diagram showing an example of a network setting screen S3. FIG. 7 is a diagram showing an example of a main setting screen S4 for the copy function.

Various setting screens are displayed on the display portion 11 in the operation panel 1 of the multifunction peripheral 100. In response to operations performed with respect to the soft keys in one of the setting screen and the hard keys 13 arranged on the operation panel 1, the display portion 11 switches the setting screens to be displayed.

The main menu screen S1 shown in FIG. 4 is a screen at the top of the screen hierarchy. The main menu screen S1 displays, in its upper portion, eight function selection keys K1 used to have a selected function (job) executed and obtain a desired result. An icon (an image) is attached to each of the function selection keys K1 to indicate the corresponding function. A function to use (a kind of job from among jobs such as copy, scan-transmission, etc.) can be selected by touching the display position of any one of the function selection keys K1. Then, the display portion 11 displays a function setting screen corresponding to the operated function selection key K1 (of which the display position has been touched).

Moreover, in a lower portion of the main menu screen S1 displays, there arranged a group of system-related keys for system settings (settings related to the overall operations of the multifunction peripheral, settings unaccompanied by job execution). For example, by operating an apparatus information icon key K2 included in the group of system-related keys, it is possible to check amounts of toner and sheets left, and by operating a help icon key K3 included in the group of system-related keys, it is possible to display a help screen that illustrates how to operate.

When a system icon key K4 included in the group of system-related keys is operated, the panel control portion 14 makes the display portion 11 display the system menu S2 shown in FIG. 5. Here, descriptions will not be given of cases where the other system-related keys are operated. In the system menu screen S2, there are arranged a plurality of system menu keys K5 representing system-setting categories. A user touches (selects) a category (a corresponding one of the system menu keys K5) to which the setting screen of the setting value that he or she is now going to set belongs.

By selecting a common setting menu key K6, the user can make settings of contents commonly applied to all the functions, such settings including setting of the first screen (the initial screen) to be displayed when the system is turned on, setting of the notifying sound played when the operation panel 1 is operated (the operation panel 1 is provide with an unillustrated speaker), and setting to restrict the number of sheets on which printing can be performed at one time. By selecting a copy menu key K7, the user can determine in advance behaviors to be performed in copy printing, such as whether or not to automatically change the enlargement/reduction ratio when a document of a size that does not fit any of the stored sheets has been read.

When a network menu key K8 among the system menu keys K5 is operated, the panel control portion 14 makes the display portion 11 display the network setting screen S3 shown in FIG. 6. Here, settings can also be made by touching any of the other system menu keys K5, but no detailed description will be given in this regard. The host name of the multifunction peripheral is displayed on the network setting screen S3. Moreover, there is also displayed a TCP/IP setting key K9 for opening a setting screen for making settings of items relating to TCP/IP. When this TCP/IP setting key K9 is operated, the panel control portion 14 makes the display portion 11 display a setting screen (not shown) for setting items relating to TCP/IP. What can be set on the setting screen for setting the items relating to TCP/IP includes: whether or not to automatically assign an IP address to the multifunction peripheral 100 based on the DHCP protocol; an IP address and a subnet mask to be assigned to the multifunction peripheral 100 when no IP address is automatically assigned thereto; and an address of a default gateway.

The network setting screen S3 also displays change keys K10 used for switching between whether or not to use the following: Net Ware (a kind of network operating system); Apple Talk (software presented by Apple Inc. to offer a network function); WSD Scan (a scanning function by means of WSD); WSD Print (a printing function by means of WSD); Enhanced WSD (a web service using WSD and provided by the applicant); and Enhanced WSD (SSL) (a web service using WSD and provided by the applicant) on SSL. Thus, settings relating to the network can be made on the network setting screen S3.

Next, with reference to FIG. 7, a description will be given of an example of a setting screen related to job execution. FIG. 7 is a copy initial screen S4 displayed when the copy function is selected (that is, when the function selection key K1 corresponding to the copy function is selected) on the main menu screen S1 (see FIG. 4). Among setting screens related to the copy function, the copy initial screen S4 is one at the top of the screen hierarchy.

It should be noted that setting screens are provided for the other functions as well (although not described here).

The copy initial screen S4 is first displayed in a state where an easy setting tab T1 (the tab including a letter string "Quick Setup") has been selected. Where the easy setting tab T1 has been selected, the panel control portion 14 makes the display portion 11 display a setting key set by default as one that has been frequently used, or a setting key selected by the user. FIG. 7 shows an example in which, in a state where the easy setting tab T1 has been selected, setting item keys K11, K12, K13, K14, and K15 are arranged corresponding to setting items of "sheet size selection", "enlargement/reduction", "print density", "duplex print", and "aggregate print", respectively.

When the display position of one of the setting item keys K11 to K15 is touched, the panel control portion 14 makes the display portion 11 display a screen of the setting item selected by the touching, on which to set setting values. When the setting item "duplex print" is selected (that is, when the display position of the setting item key K14 is touched), a setting screen on which to set setting values of whether to copy one side or two sides of a document, for example. When the setting item "aggregate print" is selected (that is, when the display position of the setting item key K15 is touched), a setting screen is displayed on which to set setting values such as "2 in 1" or "4 in 1" indicating how many pages to be aggregated in one page, and a setting value of whether or not to provide border lines between pages aggregated on one page.

As for making settings of many miscellaneous setting items that are not displayed on the copy initial screen S4, such items including frame deletion, margins, reading resolution, document size, etc., such settings are made by touching the display position of an appropriate one of a document/sheet/finish tab T2, a color/image quality tab T3, a layout/edit tab T4, and an advanced/others tab T5, and a program tab T6, which are arranged side by side next to the easy setting tab T1. The setting items are each associated with one of the tabs in advance. When the display position of any one of the tabs is touched, the panel control portion 14 makes the display portion 11 display a setting screen that displays a list of setting item keys regarding the setting item associated with the tab that has been specified by the touching.

For example, when the position where the document/sheet/finish tab T2 is displayed is touched, the panel control portion 14 makes the display portion 11 display a setting screen including keys representing setting items related to documents and sheets, such as document size, sheet size, document orientation, sheet orientation, paper supply source, etc. Here, descriptions will not be given of the other tabs. By operating the copy initial screen S4 as described above, it is possible to have a setting screen corresponding to a desired setting item or a desired setting value displayed.

(Information Package 6)

Figures 8, 9:
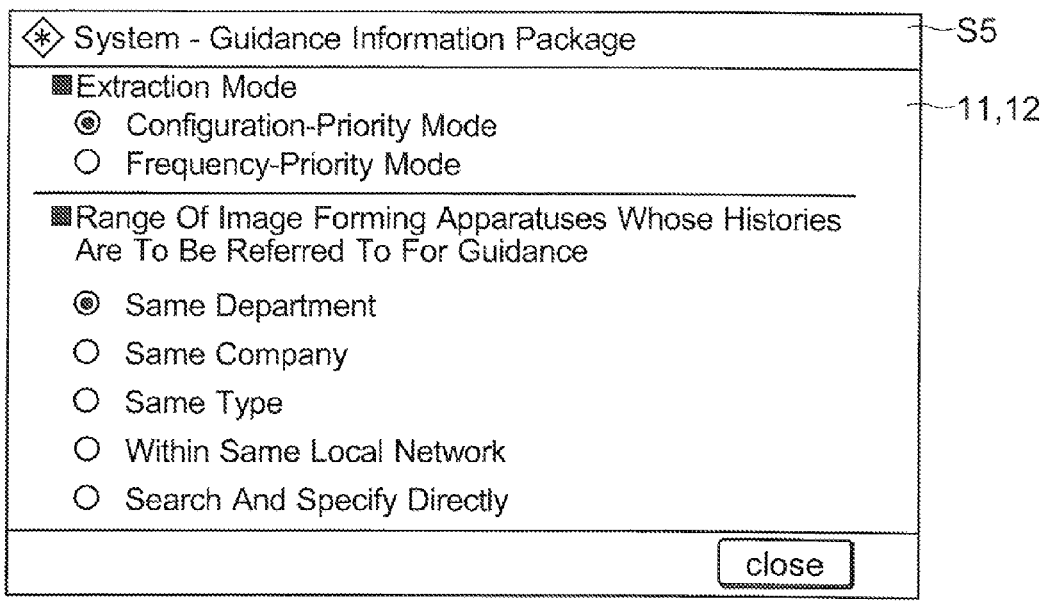
FIG. 8 is a diagram showing an example of an information package setting screen according to the embodiment.
FIG. 9 is a diagram showing an example of contents of the information package according to the embodiment.

Next, with reference to FIG. 8 and FIG. 9, a description will be given of the information package 6 which the multifunction peripheral 100 receives from the information processing apparatus 200. FIG. 8 is a diagram showing an example of an information package setting screen S5. FIG. 9 is a diagram showing an example of contents of the information package 6.

The multifunction peripheral 100 receives the information package 6 generated by the information processing apparatus 200. The storage portion 5 of the multifunction peripheral 100 stores therein the received information package 6. Then, based on settings made in advance at the operation portion (the touch panel portion 12, the hard keys 13) in relation to recommended-value display, the primary control portion 4 extracts, from the information included in the information package 6, a recommended value of a setting value settable on the setting screen currently displayed at the display portion 11. Then, the primary control portion 4 makes the display portion 11 display the extracted recommended value in a recommended-value display area 11a that is superimposed on the currently displayed setting screen. Here, setting values settable based on the setting screen currently displayed at the display portion 11 are determined in advance, and the storage portion 5 stores therein definition data that determines the setting values settable based on the various setting screens when they are displayed at the display portion 11 as a currently displayed setting screen. Based on the definition data, it is judged whether or not to display each of the setting values sellable on the currently displayed setting screen as a recommended value.

This makes it possible to have guidance displayed on each setting screen in the form of a recommended value (a setting value that is very likely to be appropriate) recommended as a setting value based on the history of settings made at another image forming apparatus (an image forming apparatus information of which is included in the information package 6). Thus, it is possible to present a user with a recommended value based on trends in settings (frequency at which settings are made at other image forming apparatuses chosen in advance) by means of the setting history D2. Moreover, by further providing information based on which to judge what setting value is appropriate, it is possible to make settings easier. Thus, a recommended value is displayed when the user makes a setting by himself or herself, to allow the user to set an appropriate setting value, and this contributes to reduction in number of times service engineers visit the user or have to be dispatched to the user. Moreover, recommended values are automatically displayed and the user does not have to do any operation such as an operation on a help key to have a help screen displayed, and thus no special operation needs to be done to have a recommended value displayed. Furthermore, a recommended value as guidance is displayed in the recommended-value display area 11*a*, and this allows the user to continue the setting operation without any problems. In addition, the information package 6, after once received, is stored in the storage portion 5, and this allows the extraction and the display of a recommended value to be done without continuous network connection among the image forming apparatus (the multifunction peripheral 100), an external apparatus such as a server, and another image forming apparatus, which is indispensable to receive online support or use an online help function. Besides, even when there is a failure in communication with the network, it causes no problem in the extraction and the display of a recommended value.

With these in mind, the information package 6 will be described with reference to FIG. 8 and FIG. 9. First, the information package 6 contains the configuration information D1 and the setting history D2 collected from each of the image forming apparatuses by the information processing apparatus 200. In other words, in order to provide the user with guidance, the communication portion 41 of the multifunction peripheral 100 receives the information package 6 from the information processing apparatus 200, the information package 6 including a bunch of setting histories (logs) and the configuration information D1 of another image forming apparatus chosen in advance.

It is set in advance the configuration information D1 and the setting history D2 of which image forming apparatus should be included in the information package 6. As shown in FIG. 8, in the multifunction peripheral 100, it is on the information package setting screen S5 that another image forming apparatus can be set from which the configuration information D1 and the setting history D2 should be collected and included in the information package 6 (which image forming apparatus should be an image forming apparatus of which the configuration information D1 and the setting history D2 are referred to for guidance).

By collecting, or through notification of, the configuration information D1 from the image forming apparatuses, the information processing apparatus 200 recognizes the types of the individual image forming apparatuses, the names of the hosts of the individual image forming apparatuses, the affiliation organizations of the individual image forming apparatuses, the installation locations of the individual image forming apparatuses, the local networks to which the individual image forming apparatuses belong to, etc. Thus, by touching the position of one of radio buttons arranged on the information package setting screen S5, it can be set what range of image forming apparatuses among those communicably connected to the information processing apparatus 200 should be chosen to include the configuration information D1 and the setting history D2 thereof in the information package 6. The panel control portion 14 receives the touch on the position of any one of the radio buttons as an input to set the range of image forming apparatuses information of which is to be included in the information package 6.

When a radio button with letters "the same local network" is marked at the multifunction peripheral 100, the information processing apparatus 200 generates the information package 6 so as to include the configuration information D1 and the setting history D2 of each of the image forming apparatus 400 and the image forming apparatus 500, and transmits the information package 6 to the multifunction peripheral 100. When a radio button with letters "the same department" is marked, the information processing apparatus 200 generates the information package 6 so as to include the configuration information D1 and the setting history or histories D2 of one or a plurality of image forming apparatuses belonging to the same department as the multifunction peripheral 100. When a radio button with letters "the same company" is marked, the information processing apparatus 200 generates the information package 6 so as to include the configuration information D1 and the setting history or histories D2 of one or a plurality of image forming apparatuses belonging to the same affiliation organization as the multifunction peripheral 100. When a radio button with letters "the same model" is marked, the information processing apparatus 200 generates the information package 6 so as to include the configuration information D1 and the setting history or histories D2 of one or a plurality of image forming apparatuses of the same "model (type, with or without a restriction to the same affiliation organization, etc.)".

When a radio button of "search and directly set" is operated, the panel control portion 14 makes a selection screen (not shown) be displayed for selection from the image forming apparatuses communicably connected to the multifunction peripheral 100. For example, the panel control portion 14 makes the selection screen display a list of the image forming apparatuses connected to the local network 600 which is the same local network as the multifunction peripheral 100 is connected to. The panel control portion 14 recognizes an image forming apparatus touched in the list as an image forming apparatus the configuration information D1 and the setting history D2 of which are to be included in the information package 6. This makes it possible, when a plurality of image forming apparatuses are included in the same local network 600, to treat only part of the plurality of image forming apparatuses as a target.

Thus, the operation portion (the touch panel portion 12, the hard keys 13) of the multifunction peripheral 100 receives a target specifying operation for specifying a target image forming apparatus the configuration information D1 and the setting history D2 of which are to be included in the information package 6. The primary control portion 4 makes the communication portion 41 transmit, to the information processing apparatus 200, data (target specifying data) indicating the target image forming apparatus among other image forming apparatuses. Moreover, the information processing apparatus 200 stores the received target specifying data in a non-volatile manner, generates data of the information package 6 including the configuration information D1 and the setting history D2 of the specified range (that is, of the image forming apparatus specified as the target), and transmits the generated information package 6 to the multifunction peripheral 100. The communication portion 41 of the multifunction peripheral 100 receives the information package 6 including the configuration information D1 and the setting history D2 of the targeted image forming apparatus.

This makes it possible to choose an image forming apparatus (a multifunction peripheral 100) information of which is to be included in the information package 6 from a desired limited range of image forming apparatuses (multifunction peripherals 100), that is, specifically, from those installed in the same department or in the same company, for example. Thus, it is possible to narrow the range of image forming apparatuses (multifunction peripherals 100) the setting history D2 of each of which is to be used for reference to a range of image forming apparatuses (multifunction peripherals 100) closely related to each other, and this makes it possible to display setting values in line with setting trends in the company or the group to which an image forming apparatus (a multifunction peripheral 100) belongs to.

Next, information (data) included in the information package 6 will be described with reference to FIG. 9. As shown in FIG. 9, for example, the configuration information D1 is included in the information package 6. Among pieces of configuration information D1 collected from the image forming apparatuses by the information processing apparatus 200, the information package 6 includes those of targeted image forming apparatuses specified as targets. As shown in FIG. 9, the configuration information D1 includes information of the following, for example: type name; host name; type of equipped optional device (model number); IP address; MAC address; affiliation organization (purchaser); affiliation department; and installation location. Information of other kinds may also be included in the configuration information D1.

The information package 6 also includes the setting history D2 of each of the targeted image forming apparatuses. The setting history D2 is data (a bunch of setting logs) indicating setting values set at each of the targeted image forming apparatuses and their setting dates and times. Specifically, with respect to setting values for job execution (that is, such setting values as are set for functions such as copy, transmission, and box functions), the execution date and time of each job and the setting values set (changed from their default values) for each job are included as logs in the setting history D2 (the log of No. 3 in the setting history D2 of the image forming apparatus A shown in FIG. 9). One or a plurality of job logs are included in the setting history D2 with respect to each image forming apparatus. On the other hand, with respect to setting values unaccompanied by job execution, that is, setting values for network communication setting, system setting, etc., the date and time when such a setting value unaccompanied by job execution and the setting value is included as a log in the setting history D2 (the logs of No. 1 and No. 2 in the setting history D2 of the image forming apparatus A shown in FIG. 9). Note that it is determined as necessary logs generated at and after which date and time should be included in the setting history D2 (this is because logs of too old settings might be useless).

And as shown in FIG. 9, the information processing apparatus 200 generates the information package 6 so as to include the configuration information D1 and the setting history D2 of each of the targeted image forming apparatuses. As shown in FIG. 9, the configuration information D1 and the setting history D2 of each of a plurality of image forming apparatuses, such as, the image forming apparatus A, the image forming apparatus B, and one more or a plurality more of image forming apparatuses (it should be noted that there can be a case where the configuration information D1 and the setting history D2 of only one image forming apparatus are included in the information package 6).

The information processing apparatus 200 generates the information package 6 of an image forming apparatus at predetermined time intervals. The predetermined time interval may be set as necessary to, for example, one day, several days, one week, several seeks, one month, etc. The data size of the information package 6 is large to some extent, although it varies depending on how many image forming apparatuses are specified as targets, how often the targeted image forming apparatuses are used, and so on. With this in mind, the multifunction peripheral 100 and the information processing apparatus 200 do not necessarily exchange information with each other each time the user performs a setting operation, but the information package 6 as a whole is stored in the storage portion 5 of the multifunction peripheral 100 and is updated at the predetermined intervals. The predetermined interval may be set at the information processing apparatus 200 or at the multifunction peripheral 100. In a case where an information package 6 is provided also to an image forming apparatus in addition to the multifunction peripheral 100, the time intervals at which the information package 6 is generated may be different for different image forming apparatuses.

The information processing apparatus 200 generates the information package 6 of the multifunction peripheral 100 once in several days. And, the information processing apparatus 200 transmits the generated information package 6 to the multifunction peripheral 100 once in several days. In the case where the information processing apparatus 200 provides an information package 6 to another image forming apparatus in addition to the multifunction peripheral 100, the information processing apparatus 200 periodically generates the information package 6 for each of the image forming apparatuses.

Thus, the communication portion 41 of the multifunction peripheral 100 receives the information package 6 transmitted once in the predetermined interval (several days) from the information processing apparatus 200. The storage portion 5 updates the information package 6 each time the communication portion 41 receives the information package 6 periodically. Thus, the information package 6 is stored in the storage portion 5. This eliminates the need for continuously keeping an image forming apparatus (such as the multifunction peripheral 100) communicable with the external information processing apparatus 200. Moreover, there is no need for downloading information necessary for displaying a recommended value from the information processing apparatus 200, which is a server, for example, for each occasion of displaying a recommended value. This eliminates the need for continuously keeping an image forming apparatus (such as the multifunction peripheral 100) communicable with an external network. Furthermore, even during a communication failure when communication with the external information processing apparatus 200 is interrupted, it is possible to display a recommended value based on the information package 6 stored in the storage portion 5.

(Modes for Extracting Recommended Value)

Next, outlines of modes for extracting a recommended value will be described with reference to FIG. 8.

The multifunction peripheral 100 of the present embodiment is provided with two modes for extracting a recommended value of a setting value corresponding to a currently displayed setting screen, one mode being a "configuration-priority mode", the other mode being a "frequency-priority mode".

In the "configuration-priority mode", preferentially extracted as a recommended value is a setting value set at an image forming apparatus similar to the multifunctional peripheral 100 in configuration, among the image forming apparatuses information of each of which is included in the information package 6. In the "frequency-priority mode", where focus is put on the frequency with which (the number of times) each setting value has been set, preferentially extracted as a recommended value is a setting value that has been set with high frequency at another image forming apparatus.

In which mode to extract a recommended value can be set on the information package setting screen S5 shown in FIG.

8. The primary control portion 4 performs processing of extracting a recommended value from the information package 6 based on the set mode.

(Configuration-Priority Mode)

Next, a description will be given of a flow of extracting a recommended value in the configuration-priority mode with reference to FIG. 10 and FIG. 11. FIG. 10 is a flow chart showing the flow of extracting a recommended value in the configuration-priority mode. FIG. 11 shows an example of a table used in the recommended value extracting processing.

"START" in FIG. 10 represents a time point, in the configuration-priority mode, at which a setting screen is opened for displaying a recommended value (that is, a screen on which a setting value can be set or that can be switched to a lower hierarchy screen for the setting). More specifically, the operation panel 1 (the touch panel portion 12, the hard keys 13) receives an operation of selecting the configuration-priority mode as an extraction mode for extracting a recommended value. Then, by shifting the screen currently displayed on the display portion 11 to a lower hierarchy screen by a selection operation on the screen currently displayed at the display portion 11, for example, a setting screen on which settings can be made with respect to a plurality of setting values can be made is displayed at the time point represented by "START" in FIG. 10. Here, the screen for displaying recommended values in the configuration-priority mode may be determined in advance.

First, the primary control portion 4 refers to the configuration information D1 included in the information package 6, and judges which of image forming apparatuses specified as targets to have information thereof included in the information package 6 (the targeted image forming apparatuses) is similar to the multifunction peripheral 100 in apparatus configuration (Step #11). In other words, in the configuration-priority mode, based on the configuration information D1 included in the information package 6, the primary control portion 4 judges which of all the other image forming apparatuses information of each of which is included in the information package 6 has a high degree of coincidence with the own apparatus (the multifunction peripheral 100) in configuration.

Specifically, the primary control portion 4 refers to the configuration information D1 included in the information package 6. Then, with respect to each of the image forming apparatuses the configuration information D1 of each of which is included in the information package 6, the primary control portion 4 calculates a value of the arithmetic expression defined in category C (the category of apparatus configuration) in the table of FIG. 11. The value of the arithmetic expression is calculated with respect to each of the image forming apparatuses information of each of which is included in the information package 6 as targets. A ratio is calculated by dividing the number of optional devices that each of calculation-target image forming apparatuses is equipped with and that are of the same type (model) as those equipped to the own apparatus (the multifunction peripheral 100) by the number of all the optional devices of the multifunction peripheral 100 (the total number of the optional devices that the own apparatus is equipped with). Note that, in the multifunction peripheral 100 of the present embodiment, the second sheet feeding portion 3b and the document conveying portion 2a are optional devices, and thus the total number is two.

Then, the primary control portion 4 judges, among the image forming apparatuses the configuration information D1 of each of which is included in the information package 6, an image forming apparatus of which the ratio obtained by the arithmetic expression is equal to or larger than a threshold value (a first reference ratio, which is 80% in the present description) to be a similarly-configured image forming apparatus that is similar to the own apparatus (the multifunction peripheral 100) in configuration. This makes it possible to display a recommended value based on the setting history D2 of an image forming apparatus similar to the own apparatus in optional-device configuration. It should be noted that the judgment on the similarity in configuration may be made by other methods. For example, the primary control portion 4 may judge an image forming apparatus of the same model as the own apparatus to be a similarly-configured image forming apparatus. Moreover, the primary control portion 4 may judge whether an image forming apparatus is a similarly-configured image forming apparatus based on other references.

Then, the primary control portion 4 checks whether or not a similarly-configured image forming apparatus has been extracted (Step #12). When no similarly-configured image forming apparatus has been extracted (No in Step #12), the flow ends there (END).

On the other hand, when a similarly-configured image forming apparatus has been extracted (Yes in Step #12), the primary control portion 4 extracts, as a recommended value, a setting value that is settable based on the setting screen currently displayed at the display portion 11 and that has been set at the image forming apparatus that has been judged to have a high degree of coincidence with the own apparatus (the multifunction peripheral 100) in configuration (Step #13). Specifically, the primary control portion 4 extracts only one setting value as a recommended value when setting values that are settable based on a screen currently displayed at the display portion 11 and that are included in the setting history or histories D2 of one or a plurality of image forming apparatuses judged and extracted as similarly-configured image forming apparatuses are all of the same one kind. On the other hand, the primary control portion 4 extracts a plurality of setting values as recommended values when the setting values included in the setting history or histories D2 of the one or the plurality of extracted image forming apparatuses are of a plurality of kinds.

This makes it possible to extract a setting value set at a similarly-configured image forming apparatus among the image forming apparatuses information of which is included in the information package 6 and to display such a setting value as a recommended value. Thus, it is possible to offer the user, as a recommended value, a setting value that has been frequently set at other similar image forming apparatuses without any problems. This helps increase the probability of displaying an appropriate value for the user to see. In particular, with regard to basic apparatus settings such as system settings in an image forming apparatus (the multifunction peripheral 100), it is possible to increase the probability of displaying a value appropriate as a recommended value.

Then, based on the one or the plurality of extracted recommended values, the primary control portion 4 generates one or a plurality of pieces of display-candidate data (a candidate or candidates to be displayed when one or a plurality of recommended values are extracted in the configuration-priority mode) (Step #14).

Specifically, when the primary control portion 4 has extracted only one setting value as a recommended value from among setting values that are settable based on a setting screen currently displayed at the display portion 11 and that are included in the setting history or histories D2 of one or a plurality of image forming apparatuses having a high degree of coincidence with the own apparatus (the multifunction peripheral 100) in configuration, the primary control portion 4 generates one piece of display-candidate data that includes a setting value of one kind as a recommended value.

Furthermore, when the primary control portion 4 has extracted, as recommended values, a plurality of kinds of setting values that are settable based on the setting screen currently displayed at the display portion 11 and that are simultaneously settable with respect to a plurality of setting items, on a one setting value for one kind basis, the primary control portion 4 generates one piece of display-candidate data that includes all the extracted recommended values.

Moreover, when the primary control portion 4 has extracted, as recommended values, a plurality of setting values that are settable based on the setting screen currently displayed at the display portion 11 and that are in a relationship such that they cannot be set simultaneously with each other (for example, setting values for the one same setting item only one of which can be selected), the primary control portion 4 generates the same number of pieces of display-candidate data as the extracted recommended values such that each of the pieces of display-candidate data includes, as a recommended value, any one of the setting values that cannot be set simultaneously with each other. For example, in the item of aggregate print, values "two in one" and "four in one" are in the relationship such that they cannot be set simultaneously with each other, and in the item of network setting, ON and OFF of Net Ware are in the relationship such that only one of them can be set at a time.

Moreover, when the primary control portion 4 has extracted, as recommended values, two or more setting values that are settable based on the setting screen currently displayed at the display portion 11 and that are in the relationship such that they cannot be set simultaneously with each other, and further, one or a plurality of setting values settable simultaneously with all of the two or more setting values have been extracted, the primary control portion 4 generates a plurality of pieces of display-candidate data such that no two setting values that cannot be set simultaneously with each other are included in the same piece of display-candidate data, and such that a combination of a plurality of recommended values that can be set simultaneously with each other is included in each of the pieces of display-candidate data (in this case, the pieces of display-candidate data each include recommended values of a plurality of kinds). For example, where the initial setting screen for the copy function is displayed, when the setting values of "two in one" and "four in one" have both been extracted as recommended values with respect to the setting item of aggregate print, and further, the setting value of "duplex print execution" with respect to the setting item of duplex print has also been extracted as a recommended value, the primary control portion 4 generates a piece of display-candidate data including the setting values of "two in one" and "duplex print execution" as recommended values, and also generates another piece of display-candidate data including the setting values of "four in one" and "duplex print execution" as recommended values.

Then, the primary control portion 4 checks whether or not a plurality of pieces of display-candidate data have been generated (Step #15). When not (No in Step #15), based on the generated piece of display-candidate data, the primary control portion 4 makes the display portion 11 display one or a plurality of recommended values (Step #16→END). Details of the display of a recommended value will be described later.

On the other hand, when it is ascertained that a plurality of pieces of display-candidate data have been generated (Yes in Step #15), the primary control portion 4 prioritizes the plurality of pieces of display-candidate data based on a predetermined sorting condition (Step #17). Then, the primary control portion 4 makes the display portion 11 display recommended values included in the highest-priority one of the pieces of display-candidate data (Step #18→END).

Here, the sorting condition can be determined as necessary. The primary control portion 4 may give a higher priority to a piece of display-candidate data including setting values that are more similar to the setting values currently set at the own apparatus (the multifunction peripheral 100). In other words, the degree of similarity in settings may be adopted as the sorting condition. Specifically, the primary control portion 4 calculates a value of the arithmetic expression defined in category D (the category of setting similarity degree) in the table of FIG. 11. With respect to each of the pieces of display-candidate data, the primary control portion 4 calculates a value (a ratio) by dividing the number of recommended values included in each of the pieces of display-candidate data that are equal to the setting values currently set at the own apparatus (the multifunction peripheral 100) by the total number of recommended values included in each of the pieces of display-candidate data. Then, the primary control portion 4 gives a priority to each of the pieces of display-candidate data based on the above-obtained ratio, giving the highest priority to the piece the above-obtained ratio of which is the highest. Here, the primary control portion 4 may exclude, from targets recommended values included in which are to be displayed, any of the pieces of display-candidate data the above-obtained ratio of which is not above the threshold value (80%) shown in FIG. 11.

Moreover, the primary control portion 4 may give a higher priority to a piece of display-candidate data including as a recommended value a setting value of a higher setting frequency. In other words, the height of setting frequencies of setting values (recommended values) may be adopted as the sorting condition. With respect to the plurality of pieces of display-candidate data, with respect to each of the recommended values included therein, the primary control portion 4 obtains a value by dividing the number of times each recommended value is recorded as having been set (the number of logs) in the setting history D2 of an image forming apparatus extracted as having a high degree of coincidence in configuration by the total number of times all the setting values have been recorded (that is, the total number of all the logs, a grand total number) in the setting history D2 of the image forming apparatus having a high degree of coincidence in configuration. Then, the primary control portion 4 may give a higher priority to a piece of display-candidate data including a recommended value the above-obtained value of which is larger. Specifically, the primary control portion 4 calculates a value of the arithmetic expression defined in category B (the category of setting frequency) in the table of FIG. 11. The primary control portion 4 may exclude, from recommended-value display targets, any of the pieces of display-candidate data the value of which calculated based on category B is not above the threshold value (30%) shown in FIG. 11.

Moreover, the primary control portion 4 may give a higher priority to a piece of display-candidate data including as a recommended value a setting value after the setting of which a shorter period of time has elapsed. In other words, the period of time elapsed after the setting of setting values (recommended values) at the other image forming apparatuses may be adopted as the sorting condition. For example, the primary control portion 4 refers to setting dates and times recorded in the setting history D2 of an image forming apparatus extracted as having a high degree of coincidence with the own apparatus (the multifunction peripheral 100) in configuration. Then, with respect to each recommended value included in a plurality of pieces of display-candidate data, the primary control portion 4 calculates the period of time elapsed between the time point of the setting of each recommended value and the current time point. Then, the primary control portion 4 may give a higher priority to a piece of display-candidate data including a recommended value that has been set as a setting value in any one of image forming apparatuses extracted as one having a high degree of coincidence in configuration, and after the setting of which a shorter period of time has elapsed. Specifically, the primary control portion 4 calculates, with respect to each recommended value, a value of the arithmetic expression defined in category A (the category of setting date and time) in the table of FIG. 11. The primary control portion 4 may exclude, from the recommended-value display targets, such a piece of display-candidate data as includes only a recommended value or values the latest setting dates and times of which are before the threshold value shown in FIG. 11.

The sorting condition may be one based on only one of the setting similarity degree, the setting frequency, and the setting date and time. Alternatively, a plurality of sorting conditions may be used in a multi-tiered manner such that, for example, sorting is performed first according to the setting similarity degree and then according to the setting frequency.

(Frequency-Priority Mode)

Figure 12:
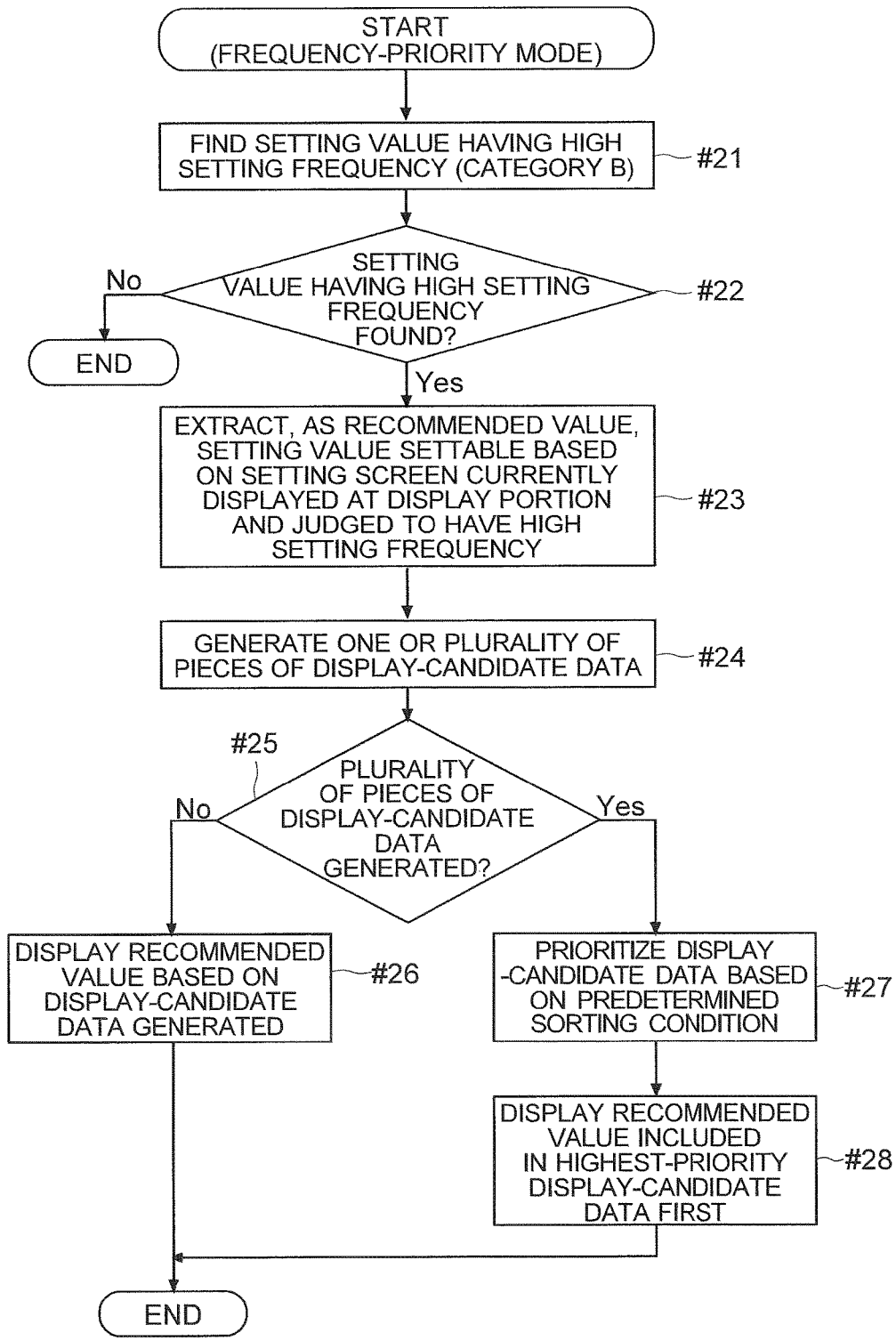
FIG. 12 is a flow chart showing a flow of extracting a recommended value in a frequency-priority mode according to the embodiment.

Next, a description will be given of a flow of extracting a recommended value in the frequency-priority mode with reference to FIG. 11 and FIG. 12. FIG. 12 is a flow chart showing the flow of extracting a recommended value in the frequency-priority mode.

"START" in FIG. 12 represents a time point, in the frequency-priority mode, at which a setting screen for displaying a recommended value (that is, a screen on which a setting value can be set or that can be switched to a lower hierarchy screen for the setting) is opened. Specifically, the operation panel 1 (the touch panel portion 12, the hard keys 13) has received an operation of selecting the frequency-priority mode as an extraction mode for extracting a recommended value, and by shifting the screen currently displayed on the display portion 11 to a lower hierarchy screen by a selection operation on the screen currently displayed on the display portion 11, for example, a setting screen on which setting of a plurality of setting values can be made is displayed at the time point represented by "START" in FIG. 12. Here, the screen for displaying a recommended value in the frequency-priority mode may be determined in advance.

First, the primary control portion 4 refers to the setting history D2 of each of the image forming apparatuses information included in the information package 6. Then, the primary control portion 4 judges which of the setting values settable on the currently displayed setting screen has been set with high frequency (Step 21). In other words, when the frequency-priority mode is selected, the primary control portion 4 judges, based on the logs included in the setting history D2 included in the information package 6, which of the setting values has been selected most frequently at the targeted image forming apparatuses.

Specifically, the primary control portion 4 refers to the setting history D2 included in the information package 6, and calculates, with respect to each of the targeted image forming apparatuses, a value of the arithmetic expression defined in category B (the category of setting frequency) in the table of FIG. 11. Specifically, the primary control portion 4 refers to the setting history D2 of each of all the image forming apparatuses information of which is included in the information package 6, obtains a total number of setting times (the number of logs) with respect to each of the setting values settable based on the setting screen currently displayed at the display portion 11, and further obtains a grand total number (the total number of logs) which is a total number of times of settings made at all the image forming apparatuses the setting history D2 of each of which is included in the information package 6. The primary control portion 4 calculates a ratio by dividing the total number of setting times of each of the setting values by the grand total number. Based on a second reference ratio, the primary control portion 4 judges which of the setting values has been set with a high setting frequency, specifically such that a setting value the above-obtained ratio of which is equal to or larger than the second reference ratio is judged to be a high-setting-frequency setting value that has been set with high frequency. Thereby, it is possible to display, as a recommended value, a setting value frequently used at the image forming apparatuses information of which is included in the information package 6 as targets.

For example, the total number of times the setting value of "two in one" has been set on the copy initial screens S4 of the image forming apparatuses (the number of logs that include the setting value "two in one") is obtained, the total number of times settings have been made at all of the image forming apparatuses (a grand total number) is obtained, and the total number of times the setting value of "two in one" has been set is divided by the grand total number.

Then, the primary control portion 4 judges, among the setting values settable based on the setting screen currently displayed at the display portion 11, a setting value of which the ratio obtained by the arithmetic expression is equal to or larger than 30%, which is a threshold value (the second reference ratio), to be a high-setting-frequency setting value. By extracting a high-setting-frequency setting value in this way, a setting value that is often used at the image forming apparatuses installed in the same department or company as the multifunction peripheral 100 is extracted as a recommended value.

Then, the primary control portion 4 checks whether or not a high-setting-frequency setting value has been able to be extracted (Step #22). When no high-setting-frequency setting value has been able to be extracted (No in Step #22), the flow ends there (END).

On the other hand, when a high-setting-frequency setting value has been able to be extracted (Yes in Step #22), the primary control portion 4 extracts, as a recommended value, a setting value that is settable based on the setting screen currently displayed at the display portion 11 and that has been judged to be a high-setting frequency setting value (Step #23). This makes it possible to extract and display, as a recommended value, a setting value that has often been set at the image forming apparatuses information of which is included in the information package 6. Thus, it is possible to provide a setting value that has been frequently set at other image forming apparatuses and is highly possibly appropriate without any problem to the user as a recommended value. In particular, it is possible to display a setting value that has often been used in job-related settings or network settings as a recommended value.

Specifically, when only one setting value among the setting values settable based on the setting screen currently displayed at the display portion 11 has been judged to be a high-setting-frequency setting value, the primary control portion 4 extracts the only one setting value as a recommended value. Moreover, when a plurality of setting values among the setting values settable based on the setting screen currently displayed at the display portion 11 have been judged to be high-setting-frequency setting values, the primary control portion 4 extracts the plurality of setting values as recommended values.

Then, based on one or a plurality of extracted recommended values, the primary control portion 4 generates one or a plurality of pieces of display-candidate data (one or a plurality of candidates of recommended values to be displayed when recommended values are extracted in the frequency-priority mode) (Step #24).

When the primary control portion 4 has extracted only one setting value from the setting values settable based on the setting screen currently displayed at the display portion 11 and included in the setting history or histories D2 of one or a plurality of image forming apparatuses information of which is included in the information package 6, the primary control portion 4 generates a piece of display-candidate data that includes one setting value as a recommended value.

Moreover, when the primary control portion 4 has extracted setting values of a plurality of kinds that are simultaneously settable and settable based on the setting screen currently displayed at the display portion 11, on a one setting value for one kind basis, the primary control portion 4 generates a piece of display-candidate data that includes all the extracted recommended values.

Furthermore, when the primary control portion 4 has extracted as recommended values only setting values that are settable based on the setting screen currently displayed at the display portion 11 but are in the relation such that they cannot be set simultaneously with each other (for example, a relation between setting values of "two in one" and "four in one" of the setting item of aggregation, which cannot be simultaneously set), the primary control portion 4 generates the same number of pieces of display-candidate data as the extracted recommended values such that each piece of the display-candidate data includes any one of the setting values that cannot be set simultaneously with each other.

When two or more setting values that are settable based on the setting screen currently displayed at the display portion 11 and are in the relation such that they cannot be set simultaneously with each other have been extracted, and in addition, another setting value that can be set simultaneously with any of the two or more setting values has been extracted as a recommended value, the primary control portion 4 generates a plurality of pieces of display-candidate data such that all possible combinations of the recommended values are included one in each of the plurality of pieces of the display-candidate data with no two setting values that are not settable simultaneously with each other included in the same one of the plurality of pieces of display-candidate data. For example, on an initial setting screen for the copy function, when the setting values of "two in one" and "four in one" are both extracted as recommended values for the setting item of aggregate print, and further, a setting value of "duplex print execution" is extracted for the setting item of duplex print, two pieces of display-candidate data are generated such that one includes the recommended value of "two in one" and the recommended value of "duplex print execution", and the other includes the recommended value of "four in one" and the recommended value of "duplex print execution".

Then, the primary control portion 4 checks whether or not a plurality of pieces of display-candidate data have been generated (Step #25). When not (No in Step #25), the primary control portion 4 makes the display portion 11 display one or a plurality of recommended values based on the generated display-candidate data (Step #26→END). Details of the display of the recommended value or values will be described later.

On the other hand, when a plurality of pieces of display-candidate data have been generated (Yes in Step #25), the primary control portion 4 prioritizes the plurality of pieces of display-candidate data based on a predetermined sorting condition (Step #27). Then, the primary control portion 4 makes the display portion 11 display recommended values included in the highest-priority one of the pieces of display-candidate data first (Step #28→END). Thereby, in a case where a plurality of combinations of setting values (recommended values) have been able to be extracted, it is possible to display the recommended values in descending order starting with a recommended value that is given the highest priority and is quite possibly appropriate as a setting value for the user to set under a predetermined condition.

Here, in the frequency-priority mode, too, the sorting condition can be set as necessary. For example, the primary control portion 4 may give a higher priority to a piece of display-candidate data having a higher similarity degree with respect to the current setting values of the own apparatus (the multifunction peripheral 100). In other words, the setting similarity degree may be adopted as the sorting condition. Specifically, a value of the arithmetic expression defined in category D (the category of setting similarity degree) in the table of FIG. 11 is calculated. With respect to each of the pieces of display-candidate data, the primary control portion 4 calculates the value as a ratio by dividing the number of recommended values included each of the pieces of display-candidate data that are equal to the setting values currently set at the own apparatus (the multifunction peripheral 100) by the total number of recommended values included in the pieces of display-candidate data. Then, the primary control portion 4 gives a priority to each of the pieces of display-candidate data in the descending order based on the above-obtained ratio, giving the highest priority to the piece the above-obtained ratio of which is the highest. Here, the primary control portion 4 may exclude any of the pieces of display-candidate data the above-obtained ratio of which is not above the threshold value shown in FIG. 11 from the targeted pieces of display-candidate data, recommended values included in which are to be displayed.

Moreover, the primary control portion 4 may give a higher priority to a piece of display-candidate data including, as a recommended value, a setting value set at a an image forming apparatus having a higher degree of coincidence with the own apparatus (the multifunction peripheral 100) in configuration. In other words, the degree of coincidence between the own apparatus (the multifunction peripheral 100) and the other image forming apparatuses in configuration may be adopted as the sorting condition. The primary control portion 4 picks out image forming apparatuses having a log where a recommended value included in the display-candidate data is set from among the image forming apparatuses information of which is included in the information package 6. Then, the primary control portion 4 refers to the configuration information D1 of each of the picked-out image forming apparatuses. Then, with respect to each of the picked-out image forming apparatuses, the primary control portion 4 calculates a value of the arithmetic expression defined in category C (the category of apparatus configuration) in the table of FIG. 11. Specifically, the primary control portion 4 calculates a ratio by dividing the number of types of optional devices that are commonly provided in the own apparatus (the multifunction peripheral 100) and in each of the other image forming apparatuses by the total number of optional devices the own apparatus (the multifunction peripheral 100) is equipped with. Then, the primary control portion 4 judges an image forming apparatus the ratio of which is higher to have a higher degree of coincidence with the own apparatus (the multifunction peripheral 100) in configuration. Here, the primary control portion 4 may give a higher priority to a piece of display-candidate data, among the plurality of pieces of display-candidate data, which includes as a recommended value a setting value set at an image forming apparatus the above-obtained ratio of which is higher. The primary control portion 4 may exclude, from targets recommended values included in which are to be displayed, a piece of display-candidate data the value of which calculated based on category C is not above the threshold value shown in FIG. 11.

Moreover, the primary control portion 4 may give a higher priority to a piece of display-candidate data including as a recommended value a setting value after setting of which a shorter period of time has elapsed until a current time. In other words, the period of time elapsed after the setting of setting values (recommended values) at other image forming apparatuses may be adopted as the sorting condition. For example, the primary control portion 4 refers to the information package 6, and obtains the latest setting date and time of each of the setting values extracted as recommended values. Then, the primary control portion 4 may give a higher priority to a piece of display-candidate data including a recommended value set as a setting value a shorter period of time before a current time. Specifically, the primary control portion 4 calculates a value of the arithmetic expression defined in category A (the category of setting date and time) in the table of FIG. 11. The primary control portion 4 may exclude, from targets recommended values included in which are to be displayed, a piece of display-candidate data that has recommended values the latest setting date and time of each of which is before the threshold value shown in FIG. 11.

The sorting condition may be one based on only one of the setting similarity degree, the degree of coincidence in configuration, and the setting date and time. Alternatively, a plurality of sorting conditions may be used in a multi-tiered manner such that, for example, first sorting is performed first according to the setting similarity degree and then according to the setting frequency.

(Display and Setting of Recommended Values)

Figure 13:
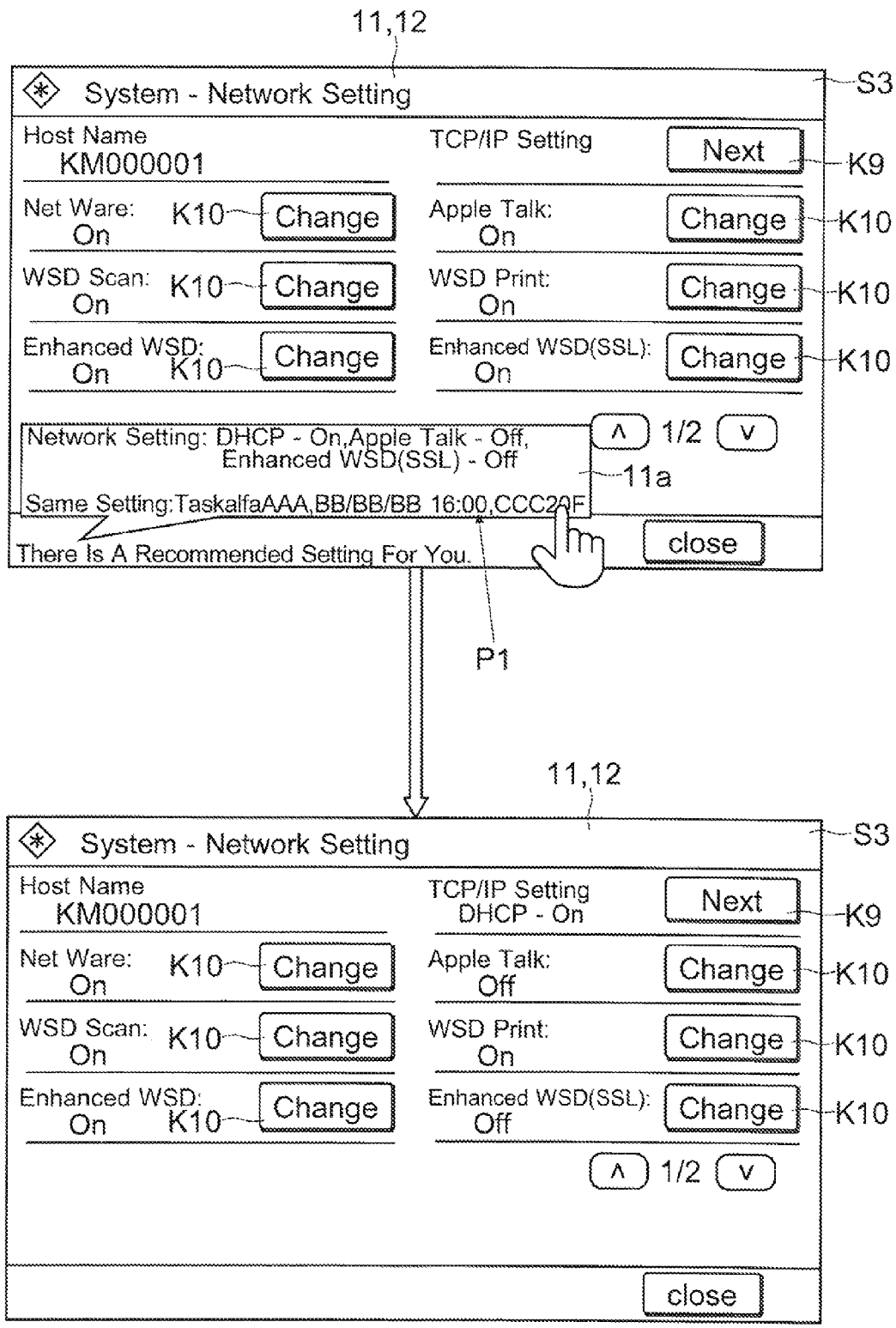
FIG. 13 is a diagram showing an example of a display of recommended values and an example of settings made by using the recommended values, on the network setting screen according to the embodiment.

Next, based on FIG. 13 and FIG. 14, descriptions will be given of operations of displaying extracted recommended values and setting of the recommended values as setting values. FIG. 13 shows diagrams illustrating an example of display of recommended values and setting by using the recommended values on the network setting screen S3. FIG. 14 shows diagrams illustrating display of recommended values and setting by using the recommended values on the main setting screen S4 for the copy function.

As illustrated in each of upper diagrams of FIG. 13 and FIG. 14, the primary control portion 4 has one or a plurality of extracted recommended values displayed in the recommended-value display area 11a which is superimposed on the currently displayed setting screen (the network setting screen S3 in FIG. 13 and the main setting screen S4 for the copy function in FIG. 14). Note that FIG. 13 and FIG. 14 each show an example of recommended-value display when the primary control portion 4 has generated one piece of display-candidate data in the configuration-priority mode and in the frequency-priority mode.

The shape of the recommended-value display area 11a can be determined as necessary. FIG. 13 and FIG. 14 each show an example where the recommended-value display area 11a has a balloon shape. Based on a recommended-value display instruction received from the primary control portion 4, the panel control portion 14 makes the display portion 11 display a message such as "Recommended Settings for You" at a lower portion of the setting screen on which the recommended values are displayed. Then, the primary control portion 4 conveys one or a plurality of extracted recommended values to the panel control portion 14, which then has the one or the plurality of recommended values displayed within the recommended-value display area 11a of the display portion 11.

Here, the primary control portion 4 provides the panel control portion 14 with information (supplementary parameter P1) to supplement the extracted recommended value or values, and provides the panel control portion 14 with an instruction to display the supplementary parameter P1 as well. Then, the panel control portion 14 makes the display portion 11 display the supplementary parameter P1 together with the recommended value or values within the recommended-value display area 11a. This allows a user to see at which of other image forming apparatuses the settings represented by the recommended value or values have been made.

The supplementary parameter P1 includes the date (year, month, day) and time when the same setting value as a recommended value displayed in the recommended-value display area 11a has been set at any of the image forming apparatuses information of which is included in the information package 6. The supplementary parameter P1 also includes a letter string indicating the image forming apparatus at which the same setting value as the recommended value displayed in the recommended-value display area 11a has been set.

The primary control portion 4 chooses, as a supplementary-parameter-P1 generation target with respect to which the supplementary parameter P1 is to be generated, an image forming apparatus at which an extracted recommended value has been set and the configuration of which is the most similar to that of the own apparatus (the multifunction peripheral 100) or at which an extracted recommended value has been set at the latest date and time. It is set, in advance at the operation panel 1, based on the configuration information D1 and the setting history D2 of which image forming apparatus the supplementary parameter P1 is to be displayed. The primary control portion 4 generates the supplementary parameter P1, in accordance with settings, based on information of the type name, the affiliation group (the purchaser), the service department, the installation location, etc. included in the configuration information D1 of the image forming apparatus at which the extracted recommended value has been set and the configuration of which is the most similar to that of the own apparatus (the multifunction peripheral 100) or at which the extracted recommended value has been set at the latest date and time. The primary control portion 4 also makes the supplementary parameter P1 include the setting date and time of the recommended value at the image forming apparatus chosen as a target of supplementary-parameter-P1 generation (here, in a case where there are a plurality of recommended values or where a recommended value has been set a plurality of number of times, the latest date and time).

As a result, as shown in FIG. 13 and FIG. 14, displayed as the supplementary parameter P1 under the recommended values displayed in the recommended-value display area 11a are the type names (the type name "TaskalfaAAA" in the example of FIG. 13 and the type name "TaskalfaDDD" in the example of FIG. 14), the installation location ("CCC20F (meaning the 20th floor of a place called CCC)" in the example of FIG. 13, and "FFF15F (meaning the 15th floor of a place called FFF)" in the example of FIG. 14), and the setting date and time of the recommended values at the image forming apparatus ("BB/BB/BB 16:00" in the example of FIG. 13, and "EE/EE/EE 14:00" in the example of FIG. 14).

The primary control portion 4 transmits the generated supplementary parameter P1 to the panel control portion 14 together with one or a plurality of recommended values that have been extracted. The panel control portion 14 makes the display portion 11 display the supplementary parameter P1 together with the one or the plurality of recommended values that have been received in the recommended-value display area 11a. Note that the primary control portion 4 may make the supplementary parameter P1 also include the host name, the kind (model number) of an equipped optional device, the IP address, the MAC address, the service department, etc. of the image forming apparatus the configuration information D1 and the setting history D2 of which the primary control portion 4 has referred to in generating the supplementary parameter P1.

Then, the touch panel portion 12 (the operation portion) receives an operation (a previously determined batch setting operation) of setting the recommended value or values as a setting value or setting values with the one or the plurality of recommended values displayed in the recommended-value display area 11a. The batch setting operation, which is performed when a plurality of recommended values are displayed in the recommended-value display area 11a, is an operation of setting the plurality of recommended values as setting values all at once. This makes it possible to set the one or the plurality of recommended values as a setting value or setting values all at once by a single operation on the recommended-value display area 11a, without shifting the screen to another screen for setting a setting value. Here, only one setting value is changed (set) in the batch setting operation when only one recommended value is displayed in the recommended-value display area 11a.

Steps of performing the batch setting operation can be set as necessary. Specifically, in the multifunction peripheral 100 of the present embodiment, the batch setting operation is defined as an operation of touching the inside of the recommended-value display area 11a once, or an operation of touching the inside of the recommended-value display area 11a continuously twice or more.

As shown in lower diagrams of FIG. 13 and FIG. 14, in a case where the batch setting operation is received when a plurality of recommended values are displayed in the recommended-value display area 11a, a plurality of setting values are changed (set) in one single operation. Specifically, when a touch is made on the recommended-value display area 11a shown in FIG. 13 where "DCHP-On", "Apple Talk-Off", and "Enhanced WSD(SSL)-Off" are displayed as recommended values, the setting values corresponding to the recommended values are changed to the respective recommended values all at once as shown in the lower diagram of FIG. 13.

Moreover, when a touch is made on the recommended-value display area 11a shown in FIG. 14 where "Duplex-one side→both sides" and "Combine-2 in 1" are displayed as recommended values, the setting values corresponding to the recommended values are changed to the respective recommended values all at once as shown in the lower diagram of FIG. 14.

(Switching of Displayed Recommended Values)

Next, based on FIG. 15, the switching of displayed recommended values when a plurality of pieces of display-candidate data have been generated. FIG. 15 show diagrams illustrating an example of the switching of displayed recommended values when a plurality of pieces of display-candidate data have been generated.

There are cases where the primary control portion 4 generates a plurality of pieces of display-candidate data. In such cases, the primary control portion 4 prioritizes the generated pieces of display-candidate data, and makes the display portion 11 display a recommended value corresponding to the highest-priority one of the pieces of display-candidate data in the recommended-value display area 11a.

Here, when the primary control portion 4 has generated a plurality of pieces of display-candidate data, it notifies the panel control portion 14 that a plurality of pieces of display-candidate data have been generated and that an "another-candidate key" K16 should be displayed for changing the recommended value displayed in the recommended-value display area 11a to another recommended value.

On receiving these notifications, the panel control portion 14 makes the display portion 11 display the another-candidate key K16 in the recommended-value display area 11a, at a position that does not overlap with letter strings or sign strings of the recommended value and of the supplementary parameter P1. Then, when the operation portion (the touch panel portion 12) has received a touching operation on the another-candidate key K16, as shown in the lower diagram of FIG. 15, the primary control portion 4 (the panel control portion 14) makes the display portion 11 display a recommended value included in the next-priority one of the pieces of display-candidate data in the recommended-value display area 11a. Thereby, when a plurality of combinations of setting values (recommended values) have been extracted, it is possible to switch the combinations of recommended values to be displayed one after another. Moreover, it is also possible to compare setting values set at other image forming apparatuses.

In the example shown in FIG. 15, the another-candidate key K16 is operated on the main setting screen S4 for the copy function when the recommended values of "Duplex-one side→two sides, Combine-two in one" are shown, and thereby the the displayed recommended values are switched to the recommended values of "Duplex-one side→two sides, Combine-four in one".

It should be noted that the present disclosure can also be regarded as a disclosure of the image forming system 300 of the embodiment including the system of the information processing apparatus 200 and an image forming apparatus (the multifunction peripheral 100). The information processing apparatus 200 is communicably connected with individual image forming apparatuses, from each of which the information processing apparatus 200 collects the setting history D2 and the configuration information D1, the setting history D2 including a setting value set at each of the communicably connected image forming apparatuses and the setting date and time of the setting value, the configuration information D1 indicating the configuration of each of the communicably connected image forming apparatuses.

The image forming apparatus (the multifunction peripheral 100) includes the display portion 11 that displays setting screens for making settings, the communication portion 41 that receives the information package 6 for providing guidance to a user, the information package 6 including the setting history D2 and the configuration information D1 of another image forming apparatus chosen in advance by the information processing apparatus 200, the storage portion 5 that stores the information package 6 therein, the operation portion (the touch panel portion 12, the hard keys 13) that receives an operation with respect to a setting screen displayed at the display portion 11 and an operation of making a setting, and the control portion (the primary control portion 4) that, based on a setting made at the operation portion in advance, extracts a recommended value of one setting value or of each of a plurality of setting values settable based on a setting screen currently displayed at the display portion 11 from the information included in the information package 6, and makes the display portion 11 display the one extracted recommended value or the plurality of extracted recommended values in the recommended-value display area 11a superimposed on the currently displayed setting screen. With this image forming system 300, which includes the multifunction peripheral 100, it is possible to obtain the same advantage as can be obtained with the multifunction peripheral 100.

Moreover, the present disclosure can be regarded also as a method.

The embodiments of the present disclosure described herein are not meant to limit the scope of the present disclosure in any manner. The present disclosure may be implemented by making various modifications thereto without departing from the spirit of the present disclosure.

The present disclosure is applicable to an image forming apparatus and an image forming system including an image forming apparatus and an information processing apparatus.

What is claimed is:

1. An image forming apparatus comprising:
    a display portion that is disposed in an operation panel, and displays a setting screen for making a setting;
    a communication portion
        that includes a connector, a socket, and a chip for communication control,
        that communicates with an information processing apparatus communicably connected with individual image forming apparatuses, from each of which the information processing apparatus collects a setting history and configuration information, the setting history including a setting value set at each of the individual image forming apparatuses and setting date and time of the setting value, the configuration information indicating a configuration of each of the individual image forming apparatuses, and
        that receives from the information processing apparatus an information package used to provide guidance to a user, the information package including the setting history and the configuration information of another image forming apparatus;
    a storage portion that includes an HDD, and stores therein the information package received from the information processing apparatus;
    an operation portion that includes a touch panel and a hard key, and receives an operation with respect to a setting screen of the display portion and an operation of setting a setting value; and
    a control portion
        that includes a CPU and an image processing portion,
        that, based on a recommended-value related setting made at the operation portion in advance, refers to the configuration information to make a judgment on which of image forming apparatuses included in the information package is similar to an own image forming apparatus in apparatus configuration, or refers to the setting history included in the information package to make a judgment on which of setting values settable from a currently displayed setting screen has been set with high frequency,
        that extracts, based on a result of the judgment, a recommended value of one setting value or of each of a plurality of setting values settable based on a currently displayed setting screen at the display portion, and
        that makes the display portion display the recommended value, which has been extracted, in a recommended-value display area superimposed on the currently displayed setting screen.

2. The image forming apparatus according to claim 1,
    wherein the operation portion receives a target-specifying operation for specifying an image forming apparatus as a target the configuration information and the setting history of which are to be included in the information package, and
    wherein the communication portion notifies the information processing apparatus of the image forming apparatus specified as the target, and receives the information package including the configuration information and the setting history of the image forming apparatus specified as the target.

3. The image forming apparatus according to claim 1,
    wherein the operation portion receives an operation of selecting a configuration-priority mode as an extraction mode, and
    wherein when the configuration-priority mode is selected, the control portion judges, based on the configuration information included in the information package, which of other image forming apparatuses information of each of which is included in the information package has a high degree of coincidence with an own image forming apparatus in configuration, and the control portion extracts, as the recommended value, a setting value that is settable based on a setting screen currently displayed at the display portion and that has been set at an image forming apparatus that has been judged to have a high degree of coincidence with the own image forming apparatus in configuration.

4. The image forming apparatus according to claim 3,
    wherein when the configuration-priority mode is selected, with respect to each of the other image forming apparatuses information of each of which is included in the information package, the control portion calculates a ratio by dividing a number of types of optional devices commonly equipped to both the own image forming apparatus and each of the other image forming apparatuses by a total number of optional devices that the own image forming apparatus is equipped with, and judges an image forming apparatus the ratio of which is above a first reference ratio to be an image forming apparatus having a high degree of coincidence with the own image forming apparatus in configuration.

5. The image forming apparatus according to claim 1,
    wherein the operation portion receives an operation of selecting a frequency-priority mode as an extraction mode, and
    wherein when the frequency-priority mode is selected, based on the setting history included in the information package, the control portion judges which of setting values settable from the currently displayed setting screen has been set with high frequency, and extracts, as the recommended value, a setting value that is settable based on the setting screen currently displayed at the display portion and that has been judged to have been set with high frequency.

6. The image forming apparatus according to claim 5, wherein the control portion
refers to the setting history of each of all the image forming apparatuses included in the information package,
obtains a total number of setting times each of the setting values settable based on the setting screen currently displayed at the display portion has been set,
further obtains a grand total number which is a sum of numbers of times settings have been made at all the image forming apparatuses the setting history of each of which is included in the information package,
calculates a ratio by dividing the total number of setting times by the grand total number, and
judges a setting value the ratio obtained with respect to which is equal to or higher than a second reference ratio to be a setting value having high setting frequency.

7. The image forming apparatus according to claim 1, wherein when the control portion has extracted, as the recommended value, two or more setting values that are settable based on the setting screen currently displayed at the display portion and that are in a relationship such that the two or more setting values cannot be set simultaneously with each other, the control portion generates a same number of pieces of display-candidate data as the setting values extracted as the recommended value such that each of the pieces of the display-candidate data includes, as the recommended value, any one of the setting values that cannot be set simultaneously with each other,
wherein when the control portion has extracted, as the recommended value, two or more setting values that are settable based on the setting screen currently displayed at the display portion and that are in a relationship such that the two or more setting values cannot be set simultaneously with each other, and the control portion has also extracted, as the recommended value, another setting value that is settable simultaneously with both of the setting values extracted as the recommended value that are in the relationship such that the setting values cannot be set simultaneously with each other, the control portion generates a plurality of pieces of the display-candidate data such that the setting values that cannot be set simultaneously with each other are not included in a same one piece of the display-candidate data, and such that the plurality of pieces of the display-candidate data include different possible combinations of setting values as the recommended value, and
wherein the control portion prioritizes the plurality of pieces of the display-candidate date based on a predetermined sorting condition, and makes the recommended value included in a highest-priority one of the plurality of pieces of the display-candidate data in the recommended-value display area first.

8. The image forming apparatus according to claim 7, wherein when the control portion has generated the plurality of pieces of the display-candidate data, the control portion makes the display portion display an another-candidate key for switching the recommended value displayed in the recommended-value display area, and when the operation portion has received an operation with respect to the another-candidate key, the control portion makes the display portion display the recommended value included in a next-priority one of the plurality of pieces of the display-candidate data in the recommended-value display area.

9. The image forming apparatus according to claim 1, wherein the control portion receives a previously-determined batch setting operation performed with the recommended value displayed in the recommended-value display area, as an operation of setting, as a setting value, the recommended value displayed in the recommended-value display area.

10. The image forming apparatus according to claim 1, wherein the communication portion receives the information package transmitted from the information processing apparatus at constant time intervals determined in advance, and the storage portion updates the information package that the storage portion stores therein each time the communication portion periodically receives the information package.

11. The image forming apparatus according to claim 1, wherein the control portion makes the display portion display, as a supplementary parameter, a date and time when a setting value equal to the recommended value displayed in the recommended-value display area has been set at an image forming apparatus information of which is included in the information package and a letter string indicating the image forming apparatus at which the setting value equal to the recommended value displayed in the recommended-value setting area has been set.

12. The image forming apparatus according to claim 1, wherein the configuration information includes a type name of an image forming apparatus and a name of the image forming apparatus, a number and a kind of an optional device connected to the image forming apparatus, and an address, an affiliation organization, an installation location, and an installation department of the image forming apparatus, and wherein the setting history includes a job-execution date and time and a changed setting value.

13. An image forming system, comprising:
an information processing apparatus; and
an image forming apparatus,
wherein the information processing apparatus is communicably connected to individual image forming apparatuses, from each of which the image processing apparatus collects
a setting history including a setting value set at each of the image forming apparatuses and a setting date and time of the setting value, and
configuration information indicating a configuration of each of the image forming apparatuses;
wherein the image forming apparatuses each comprises:
a display portion that is disposed in an operation panel, and displays a setting screen for making a setting;
a communication portion that includes a connector, a socket, and a chip for communication control, and receives, from the information processing apparatus, an information package used to provide guidance to a user, the information package including the setting history and the configuration information of another image forming apparatus;
a storage portion that stores includes an HDD, and the information package therein;

an operation portion that includes a touch panel and a hard key, and receives an operation with respect to a setting screen of the display portion and an operation of setting a setting value; and a control portion that includes a CPU and an image processing portion, that, based on a setting made in advance at the operation portion, refers to the configuration information to make a judgment on which of image forming apparatuses included in the information package is similar to an own image forming apparatus in apparatus configuration, or refers to the setting history included in the information package to make a judgment on which of setting values settable from a currently displayed setting screen has been set with high frequency, that extracts, based on a result of the judgment, a recommended value of one setting value or of each of a plurality of setting values settable based on a setting screen currently displayed at the display portion, and that makes the control portion display the extracted recommended value of the one setting value or of each of the plurality of setting values in a recommended-value display area superimposed on the setting screen currently displayed at the display portion.

14. A method for controlling an image forming apparatus, the method comprising the steps of:

displaying a setting screen for making a setting;

making an information processing apparatus collect, from each of image forming apparatuses communicably connected to the information processing apparatus: a setting history including a setting value set at each of the image forming apparatuses and a setting date and time of the setting value; and configuration information indicating a configuration of each of the image forming apparatuses;

making the image forming apparatus receive, from the information processing apparatus, an information package that includes the setting history and the configuration information of another image forming apparatus;

storing the received information package;

receiving an operation with respect to a setting screen and an operation of setting a setting value;

based on a recommended-value related setting made in advance, referring to the configuration information to make a judgment on which of image forming apparatuses included in the information package is similar to an own image forming apparatus in apparatus configuration, or referring to the setting history included in the information package to make a judgment on which of setting values settable from a currently displayed setting screen has been set with high frequency, and extracting, based on a result of the judgment, a recommended value of one setting value or of each of a plurality of setting values settable based on a currently displayed setting screen; and displaying the recommended value of the one setting value or of each of the plurality of setting values in a recommended-value display area superimposed on the currently displayed setting screen.

* * * * *